United States Patent [19]
Goldsmith

[11] Patent Number: 5,259,764
[45] Date of Patent: Nov. 9, 1993

[54] VISUAL DISPLAY APPARATUS FOR THE DISPLAY OF INFORMATION UNITS AND RELATED METHODS

[76] Inventor: Bruce W. Goldsmith, 22 Windridge La., Temple, Ga. 30179

[21] Appl. No.: 678,700

[22] Filed: Apr. 29, 1991

[51] Int. Cl.⁵ ............................................. G09B 23/00
[52] U.S. Cl. .................... 434/267; 434/272; 434/274
[58] Field of Search ........ 434/219, 224, 118, 272–275, 434/258; 395/575; 340/728

[56] References Cited

U.S. PATENT DOCUMENTS

| | | | |
|---|---|---|---|
| 4,323,351 | 4/1982 | Goldsmith | 434/272 X |
| 4,849,746 | 7/1989 | Dubner | 340/728 |
| 5,009,419 | 4/1991 | Streeter | 434/258 X |
| 5,014,234 | 5/1991 | Edwards, Jr. | 395/575 |

*Primary Examiner*—Richard J. Apley
*Assistant Examiner*—Glenn E. Richman
*Attorney, Agent, or Firm*—Ladas & Parry

[57] ABSTRACT

A display apparatus is provided which includes a display for displaying at least part of a spine including a plurality of vertebrae and for displaying a plurality of organs and a nerve system. The organs and nerve system are physiologically associated with the vertebrae. The display includes a light penetrable support on which the vertebrae and organs are displayed. A plurality of light generating devices are employed for selectively illuminating respective of the vertebrae and organs. There are provided a plurality of control switches which are connected in a circuit to the light generating devices for the illumination of the vertebrae and organs as well as the nervous system. An electronic computer is coupled to the control switches and to the circuit and is responsive to the control switches for the selection and automatic sequencing of illumination of light generating devices to create movies. A message display is provided upon which may be scrolled messages of various types including tutorial messages and messages relating to the movies. This message display is capable of operating and responding in an interactive manner. A leasing plan is also provided through use of the computer.

17 Claims, 28 Drawing Sheets

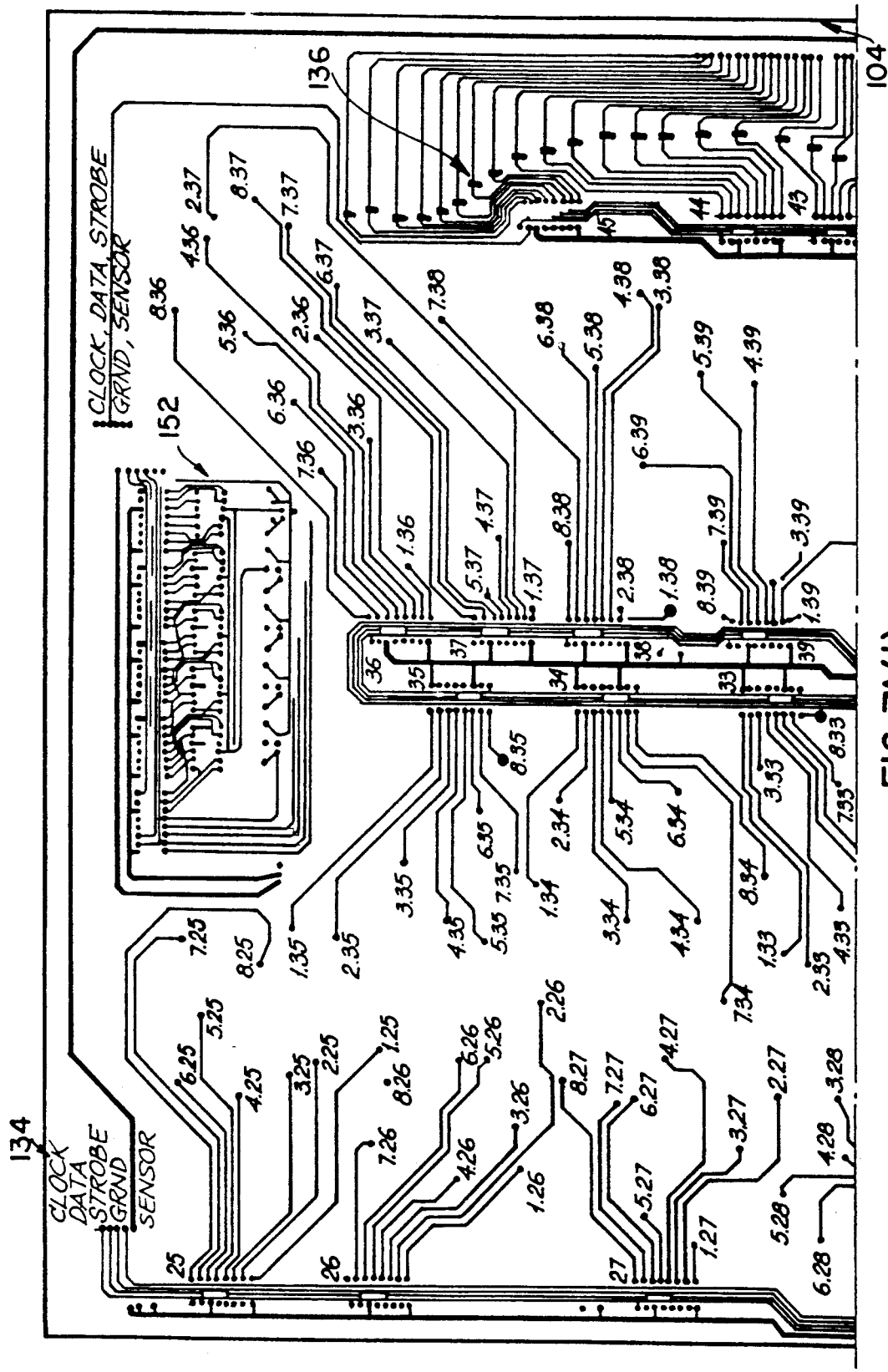
FIG. 7A(1)

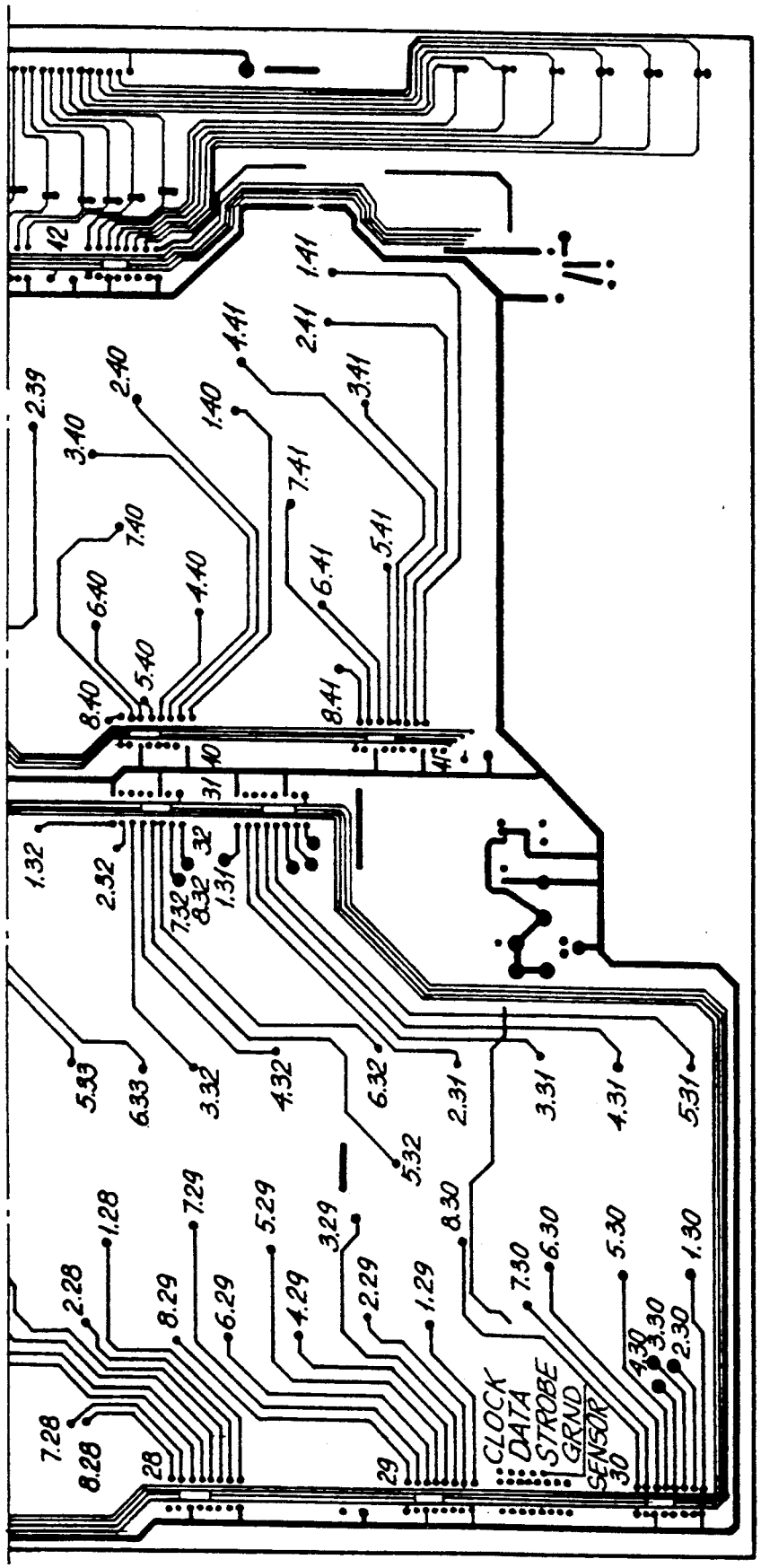
FIG. 7A(2)

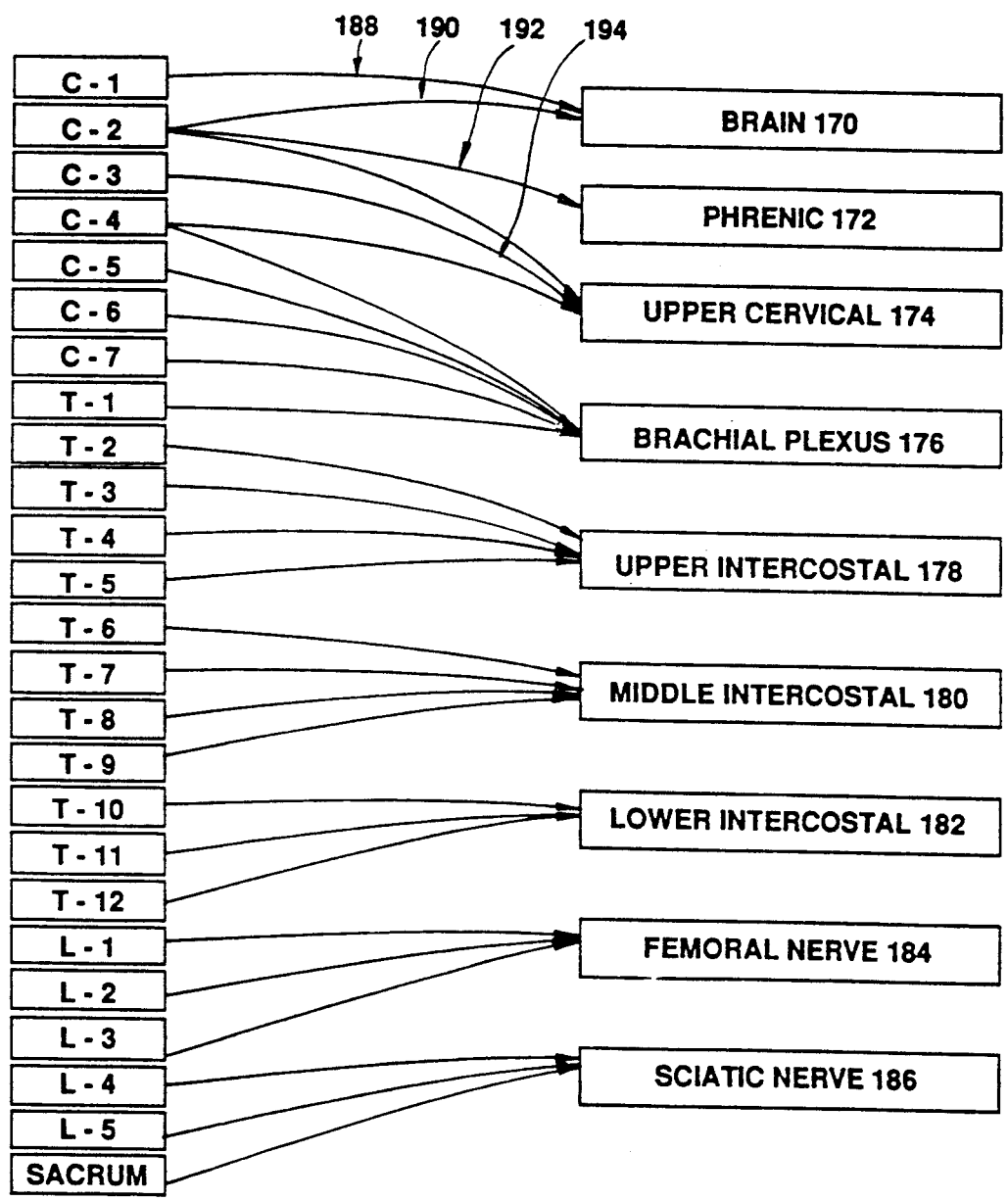
FIG. 9

09 = WILL PLACE THE VALUE FOUND IN THE NEXT BYTE INTO THE 2ND BYTE ADDRESS LOCATION.
    9, VALUE, DESTINATION

- - - - - - - - - - - -

10 = WILL ADD THE VALUE FOUND IN THE NEXT BYTE ADDRESS INTO THE 2ND BYTE ADDRESS LOCATION.
    10, SOURCE LOCATION, DESTINATION

- - - - - - - - - - - -

11 = WILL COPY THE VALUE FOUND IN THE NEXT BYTE ADDRESS INTO THE 2ND BYTE ADDRESS LOCATION.
    11, SOURCE LOCATION, DESTINATION

- - - - - - - - - - - -

12 = COMPARES THE 1ST ADDRESS VALUE TO THE 2ND ADDRESS VALUE
IF THEY ARE EQUAL THEN IT EXECUTES THE NEXT BYTE,
IF THE 1ST IS LESS THAN THE 2ND IT SKIPS TO THE 3RD BYTE,
IF THE 1ST IS GREATER THAN THE 2ND THEN IT SKIPS TO THE 5TH BYTE.
    12, LOCATION A, LOCATION B

- - - - - - - - - - - -

13 = GOTO THE ROUTINE WITH THE DECLARED LABEL NAME DEFINED IN THE PROGRAM BY 8,8,8,/NAME.
    1 3,/NAME

- - - - - - - - - - - -

14 = GOSUB (GO TO) THE SUBROUTINE WITH THE DECLARED LABEL NAME DEFINED IN PROGRAM BY 8,8,8,/NAME AND THEN RETURN BACK TO HERE WHEN A 06 IS FOUND.
    1 4,/NAME

- - - - - - - - - - - -

15 = SET BIT - TURN ON THE LIGHT AT PIN NUMBER X OF SPRAGUE CHIP NUMBER YY.
    15,X,YY (X = 1 TO 8) (YY = 25 TO 45)

- - - - - - - - - - - -

16 = RESET BIT - TURN OFF THE LIGHT AT PIN NUMBER X OF SPRAGUE CHIP NUMBER YY.
    1 6,X,YY (X = 1 TO 8) (YY = 25 TO 45)

- - - - - - - - - - - -

17 = PLAY BEEP OF A FREQUENCY AND DURATION
    17, FREQ, DUR

FIG. 18

VISUAL DISPLAY APPARATUS FOR THE DISPLAY OF INFORMATION UNITS AND RELATED METHODS

FIELD OF INVENTION

This invention relates generally to visual displays and more particularly to visual displays suitable for conveying information, for example, related to the human body or the like. The invention also relates to methods associated with the above mentioned display apparatus and more particularly to methods for the automatic sequencing of the illumination of visual display devices and to the features enumerated hereinafter.

BACKGROUND

In my earlier U.S. Pat. No. 4,323,351, issued Apr. 6, 1982, is disclosed a display apparatus in which is pictured a human body with the spinal column thereof formed of a plurality of vertebrae. Also displayed are a plurality of organs which are associated with the various vertebrae. Included in the display apparatus are push-button controls which are positionally related to the vertebrae and which when operated cause the illumination of the related organs. A further series of push-buttons controls are provided in order that the organs can be separately illuminated as desired. An arrangement is provided such that the illumination can be of a steady state type or of a pulsating mode selectively. This type of apparatus is adequate as a basic type of display device but is severely limited in the nature of functions which can be performed and in the manner by which information can be conveyed and attention focused thereupon.

SUMMARY OF INVENTION

It is an object of the invention to provide an improved visual display and related methods for the conveyance of information by means of more sophisticated techniques than heretofore available.

It is a further object of the invention to provide an improved visual displaying apparatus capable of display information by the use of illuminating or light generating devices which can be automatically sequenced.

It is yet another object of the invention to provide an improved display apparatus in which provision is made for the concomitant display of signs or messages possibly related to the information being displayed.

Yet another object of the invention is to provide an improved visual display apparatus which in a proprietary sense may be leased for sequential leasing periods and which is provided with a feature whereby the operation of the device is blocked in the event that a continuation code is not appropriately entered into the apparatus at an appropriate time.

It is still a further object of the invention to provide various features especially adapted for the display of physiological information which features are at the same time appropriately utilized in connection with the display of other types of information provided in units susceptible of being selectively and respectively illuminated.

In achieving the above and other objects of the invention, there is provided an apparatus which comprises an arrangement for displaying units of information, light generating devices for illuminating respective of the above mentioned units, and switches for operating respective of the light generating devices. Moreover, there is provided a computer arrangement or the like responsive to selected of the switch devices for effecting the automatic sequencing of selected groups of the light generating devices.

In further accordance with the invention, there is preferably provided a display sign for displaying messages related to the information or otherwise. This is accomplished in response to the operation of the computer and the switching devices in a preferred embodiment of the invention.

As indicated above, there may be provided in accordance with the invention an arrangement having sequential leasing periods. In this event the apparatus will further include an arrangement to block the operation of the computer at the expiration of the leasing periods and an arrangement to prevent the blocking of the operation of the computer whereby upon the insertion of appropriate information it will be possible to keep the computer operating from one computer period to the next.

In accordance with a more specific perception of the invention, there is provided a display apparatus comprising a display arrangement for displaying at least part of a spine including a plurality of vertebrae and for displaying a plurality of organs physiologically associated with the vertebrae, the display arrangement including a light penetrable support on which the vertebrae and organs are displayed with a plurality of light generating devices positioned for selectively illuminating respective of the vertebrae and organs. Furthermore provided is a plurality of switches supported on the above-mentioned support with a circuit arrangement coupling the switches to the light generating devices for the illumination of the vertebrae and organs. Moreover provided is an electronic computer coupled to the switches and to a circuit coupling the switches to the light generating devices. The computer is responsive to at least some of the switches for controlling the selection and automatic sequencing of the illumination of the light generating devices.

As mentioned hereinabove, the display apparatus of the invention may further comprise a display sign which is coupled by the circuit arrangement mentioned above to the computer and which includes the feature of being able to display a visually perceptible message. The computer may include features for scrolling the message on the sign and for controlling the speed of the scrolling.

In accordance with the invention the computer is provided with software information to enable the automatic sequencing of the illumination of the light generating devices. In this software information may be embodied an indication of the proprietary origin of the software. The computer in accordance with a feature of the invention will include a feature whereby it is capable of isolating and displaying the indication of proprietary origin on the above-mentioned sign.

As has also been indicated hereinabove, the computer may include the feature whereby the display apparatus functions for predetermined periods of time or in other words leasing periods. For this purpose, the computer will include a timing or clock to enable the determination of the time periods.

While there has been mentioned above the illustration or display of vertebrae and organs, it is contemplated within the scope of the invention that there will further be a display of a nerve system with respect to which further light generating devices are provided for illuminating the same. These further light generating devices will be coupled to the above-mentioned circuit for being controlled by the switches and computer.

The computer may also include the feature of providing messages to display in an tutorial sense thereby for instructing a user to respond by operating selective of the above-mentioned switches. Messages may also be provided for explaining the sequencing of illumination by the light generating devices.

In addition to the foregoing, a sound generating feature may also be incorporated into the display apparatus of the invention. This may serve various purposes such as indicating the operation of certain switches or for various other purposes which will be explained in detail hereinbelow.

The display means may furthermore include a flexible light permeable sheet bearing a plurality of information bearing ink layers to display through the sheet the aforementioned spine and organs and other information. The switches may preferably include cooperating pairs of switch elements on respective sheets, these elements being adapted for being interengaged by manipulation of the flexible sheet.

The display apparatus of the invention may furthermore include a printed circuit board on which the light generating elements are mounted. There may also be provided as a feature shaped foam spacers between the two sheets. These foam spacers will having openings contoured according to the vertebrae and organs or the like to guide light therethrough.

As will be explained hereinafter, the circuit may preferably include a plurality of electronic latches connected in series regarding the flow of data. Power, ground, strobe, and clock signals are parallel. These latches will preferably be responsive to signals received from the computer to operate the light generating devices selectively. Latches may also be coupled to the display sign in which event they will be responsive to signals received from the computer to operate the display sign matrix which is incorporated therein.

The above and other objects, features, and advantages of the invention will appear in the detailed description which follows hereinbelow as illustrated in the accompanying drawing.

BRIEF DESCRIPTION OF DRAWING

In the drawing:

FIG. 7(a) is a view corresponding to FIG. 7 illustrating some of the interior construction of various of the elements appearing in FIG. 7;

FIG. 9 is a chart illustrating some of the responses which are available in response to operation of the switches in the apparatus of FIGS. 1-7;

FIG. 18 is a chart similar to that in FIG. 17 illustrating further software features that are employed;

FIG. 27 illustrates still a further option which is available in the apparatus of FIGS. 1-7; and FIG. 28 illustrates still a further option which is available in the apparatus of FIGS. 1-7.

DETAILED DESCRIPTION

The present invention provides an improvement over the visual display system set forth in U.S. Pat. No. 4,323,351 wherein the principals of chiropractic and applied kinesiology are displayed upon the operation of buttons. As stated in U.S. Pat. No. 4,323,351, the display apparatus set forth therein clarifies the anatomical relationships which are synonymous with chiropractic approaches to healthcare. Therein are revealed a presentation having dramatic visual impact for purposes of simplifying patient education. The apparatus disclosed in the earlier patent assures of patient comprehension by the use of charts which are clearly and easily read thereby eliminating confusing and difficult terminology. Moreover, the apparatus set forth in the earlier patent fulfills the demand for accurate but functional visual aides by the use of sharply and vividly presented charts which make for a very good impression with the viewer. The present invention however goes much further in the sophisticated presentation of information in a manner and by the use of features which are applicable not only to physiological information but which as well are applicable to other types of information which can be visually displayed in such a manner as to stimulate interest and enhance clarity of presentation.

Figure 1:
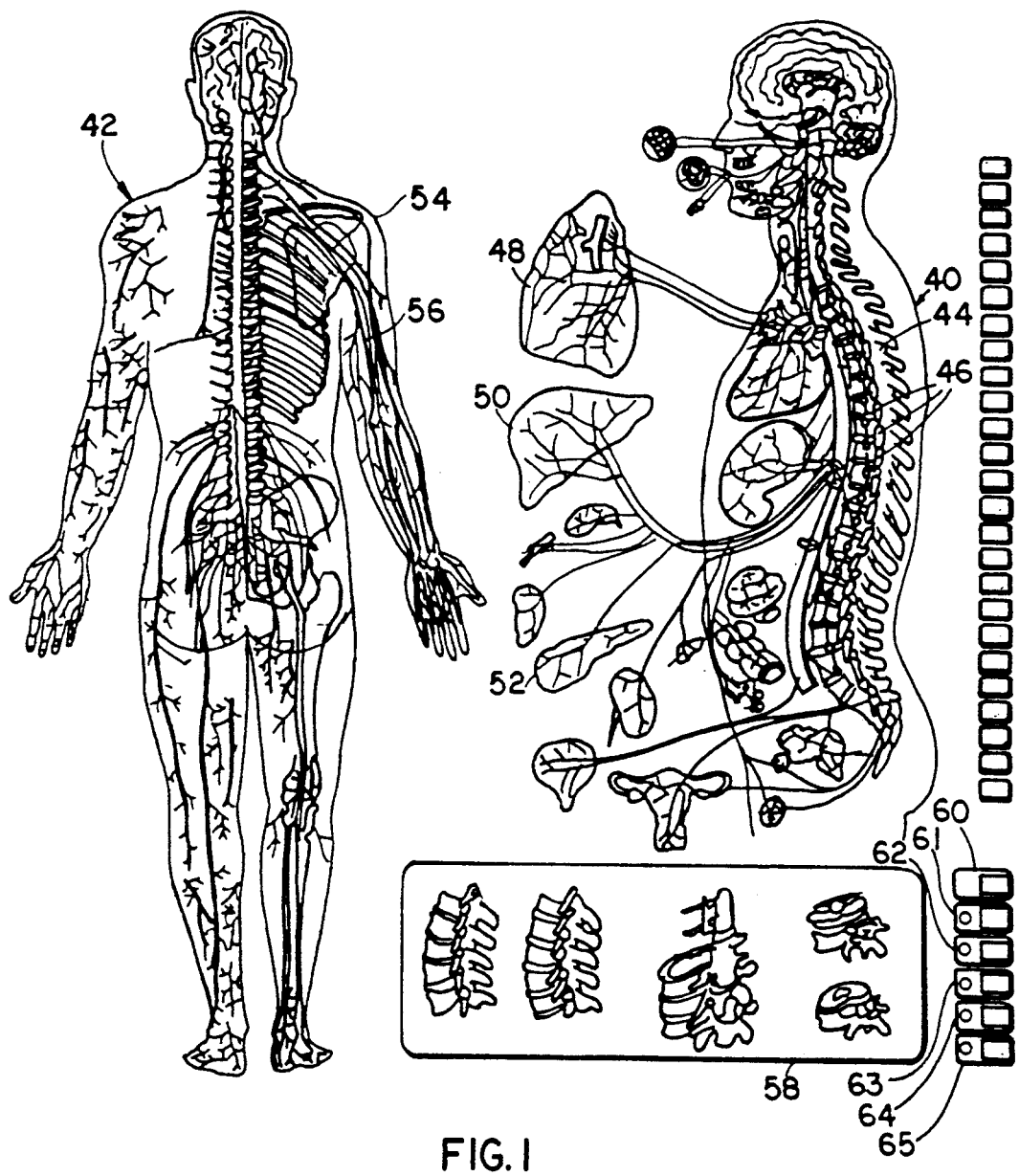
FIG. 1 is a chart illustrating selected physiological systems which may be displayed in a preferred display apparatus of the invention, the specifically illustrated display including spinal and autonomic nerve systems.

In FIG. 1 of the present application appear a side view 40 and a rear view 42. In the side view appears a spine 44 consisting of a plurality of related vertebrae 46. Also appearing, for example, are a number of organs including a lung 48, a liver 50 and a pancreas 52. Also included in the chart without limitation are a gall bladder, a spleen, a kidney, an adrenal gland, a prostate gland and a bladder. These organs are according to principles of neurology related to the respective vertebrae 46 in the spine 44.

In the rear view 42 appears a skeletal system 54 and a nerve system 56. An enlarged and more detailed view of the vertebrae appear in the inset 58.

The relationship between the vertebrae and the organs in FIG. 1 as well as with the various portions of the nerve system 56 are demonstrated, in accordance with the invention by coordinated illumination of parts of the spine and the nervous system as well as illumination of the organs. This illumination may take place selectively by operation of the switches C1–C7, switches T1–T12, and switches L1–L5 and the sacrum switch. Switches C1–C7 relate to the cranial section, switches T1–T12 relate to the thoracic section, and switches L1–L5 relate to the lumbar section. In addition, there are switches 60, 61, 62, 63, 64 and 65 which perform various functions to be explained hereinafter. It is sufficient to know, at this point in the description, that operation of the switches 60–65 can relate to the performance of specific functions while at the same time these switches are capable of varying the functions performed by operation of switches C1–C7, T1–T12 and L1–L5.

Figure 2:
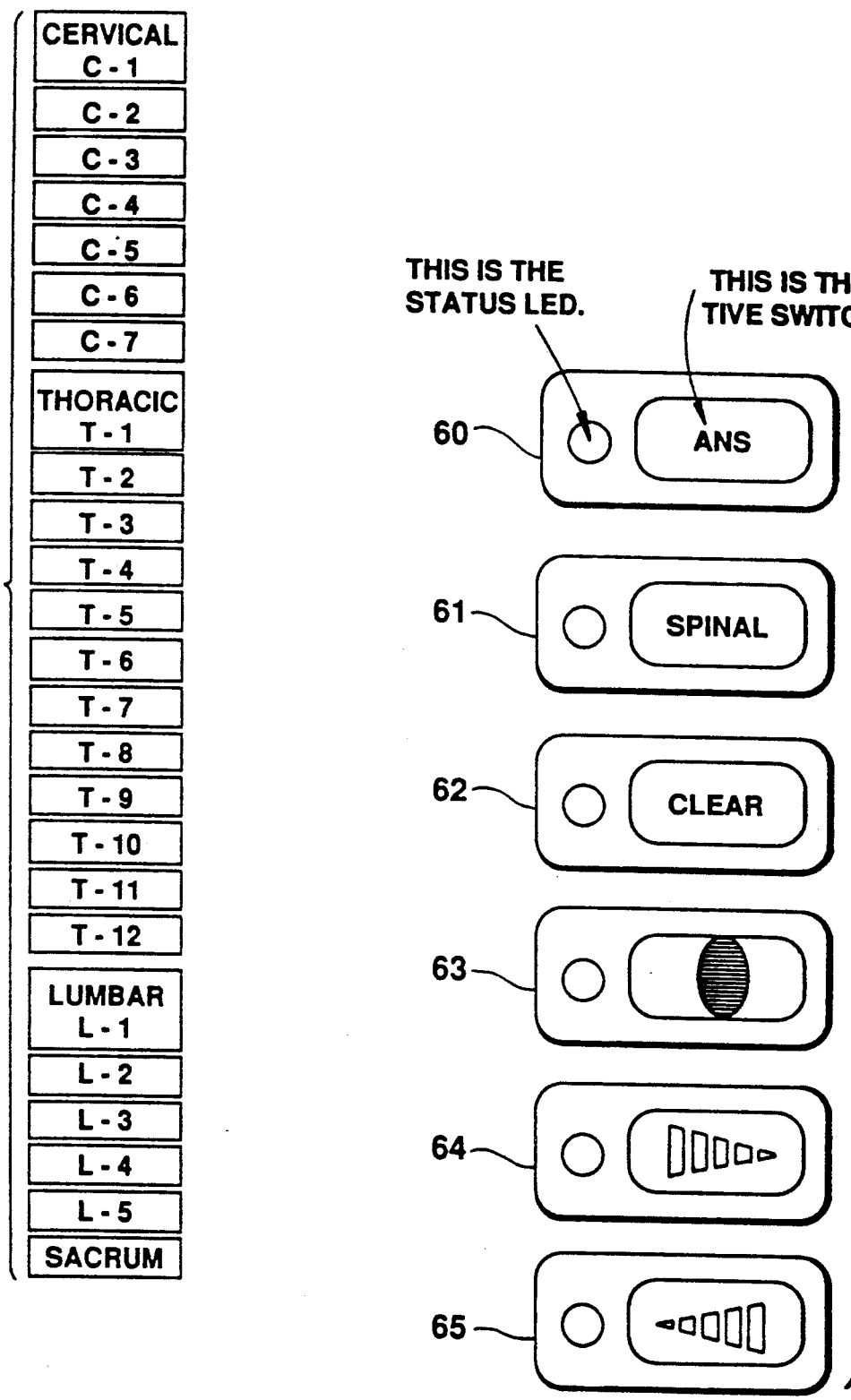
FIG. 2 is a chart illustrating switches which appear in FIG. 1 and which are utilized as controls in the apparatus of the invention according to a preferred embodiment.

All of these switches appear on enlarged scale in FIG. 2 wherein it is more clearly seen that there are 31 switches arranged in a preferably rectilinear vertical alignment on the chart front. Each individual switch pad is of generally rectilinear shape having for example an actual size 6/8th of an inch by 13/16th of an inch. In the preferred embodiment, the column from top to bottom measures 14 and 1/16 of an inch. The function setting switches 61–65 are respectively designated as ANS, SPINAL, CLEAR, LOGO, GREATER and LESSER switches. ANS is an acronym of the autonomic nerve system.

Figure 3:
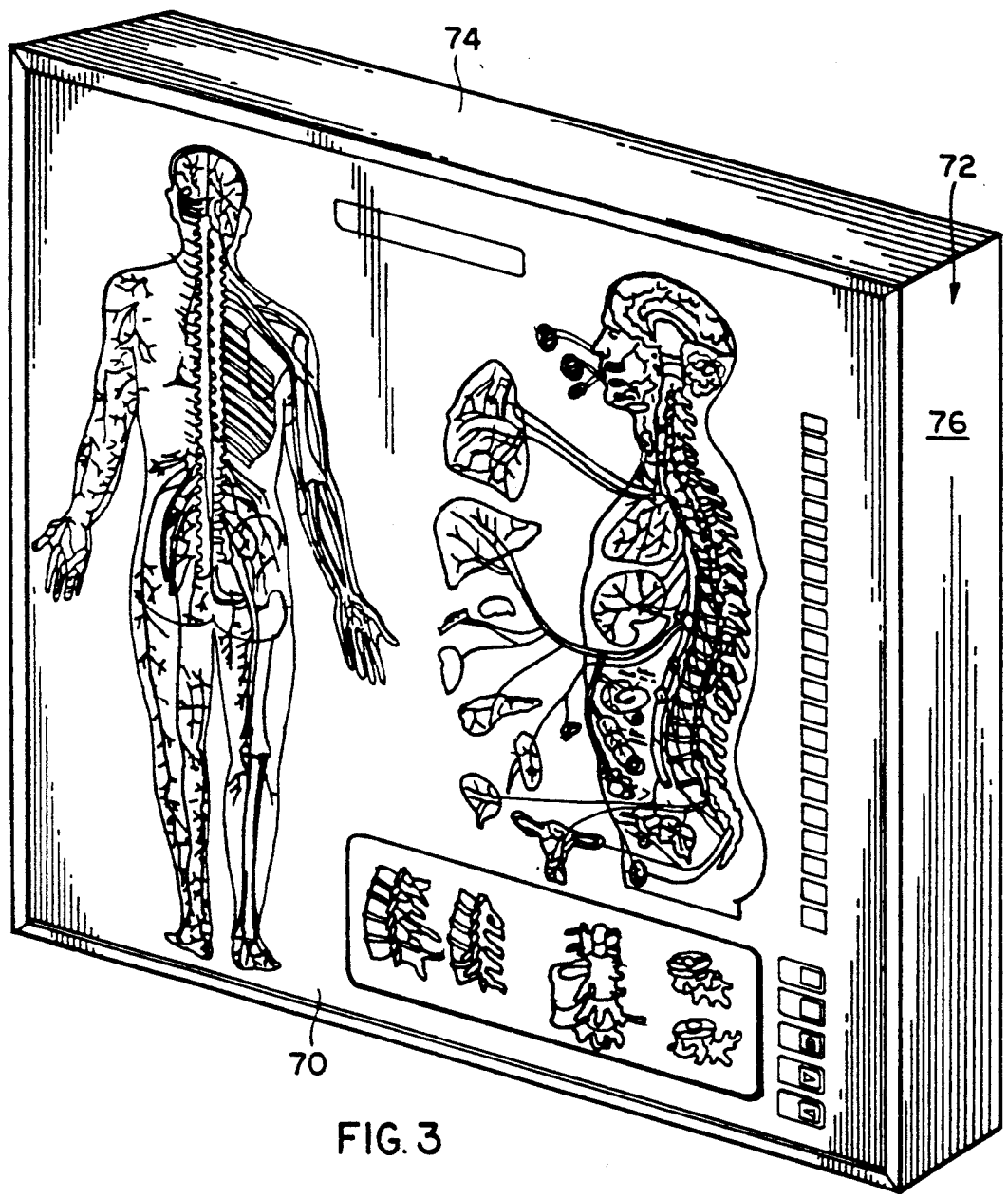
FIG. 3 is a perspective view of a display apparatus of the invention as viewed from the front.

FIG. 3 is a perspective view showing the display apparatus of a preferred embodiment of the invention substantially in entirety. In this figure appears the display chart 70, the details of which will become apparent hereinafter. It is accommodated in a casing 72. The casing 72 is seen as including a top perimetral portion 74 and a side perimetral portion 76. In this figure, the switches are all shown to reside in one common vertical alignment.

Figure 4:
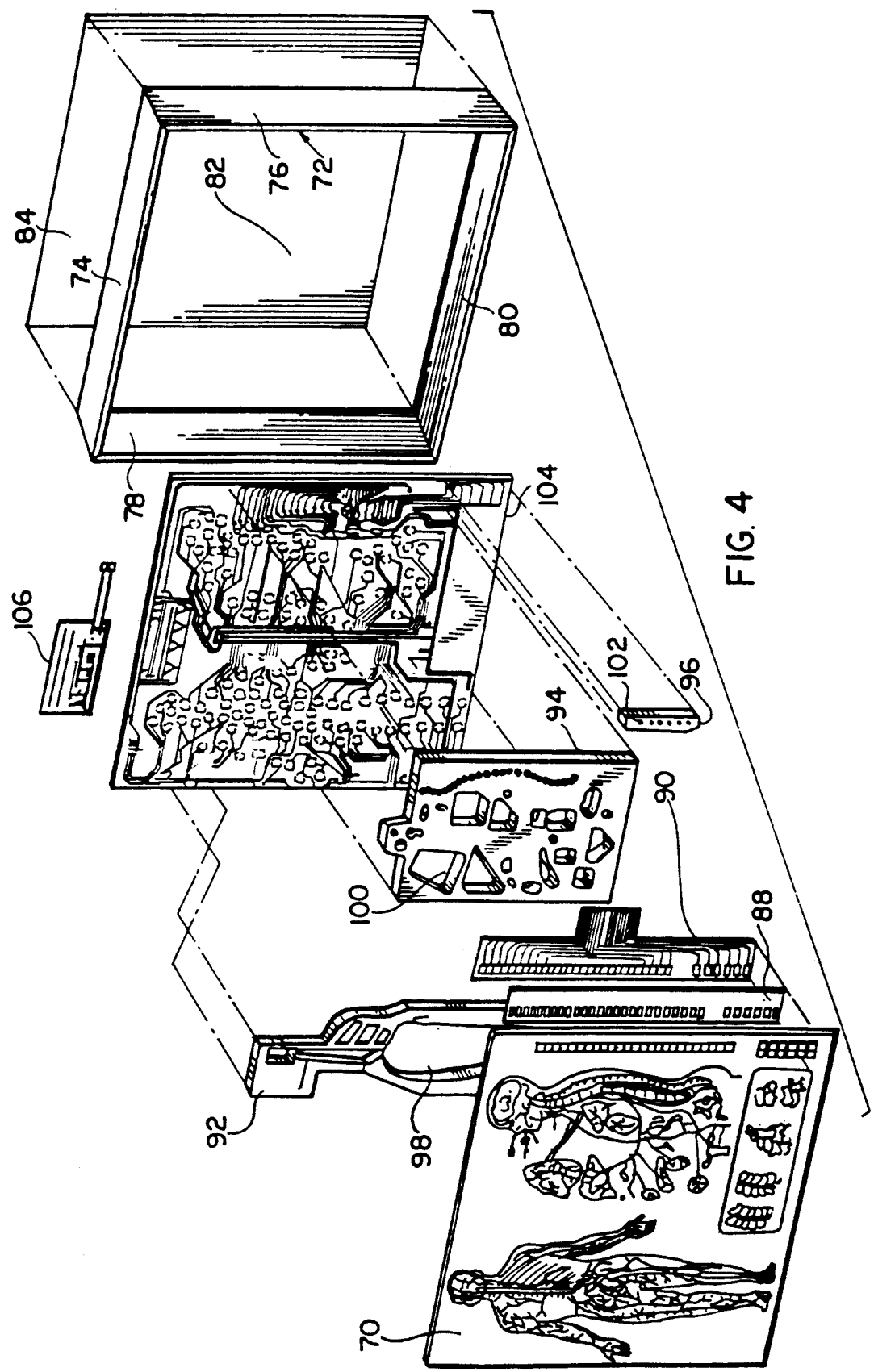
FIG. 4 is an exploded view showing some basic mechanical components of the invention.

Referring next to FIG. 4, it is seen that casing 72 also appears therein along with top 74 and lateral or side section 76. Also included in the casing 72 is the opposite lateral section 78 and the bottom 80. The casing 72 defines a center chamber 82 which at the rear is obturated by a backboard 84 made for example of plywood or metal or the like. Also appearing in FIG. 4 is the front sheet 70 (which is of a light translucent or transparent material which will be discussed in greater detail hereinbelow) bearing the physiological parts to which reference has been made above.

FIG. 4 also reveals that the switch elements described above are arranged in cooperation with a spacer 88 and a printed membrane switch panel 90. Further appearing in FIG. 4 are die-cut foam elements 92, 94 and 96 which are shown by way of example. These foam elements define openings such as shown at 98, 100 and 102, the purpose of which is to guide light from computer-and-switch controlled light generating elements which are mounted on the printed circuit board 104. All of these structural elements are of generally planar configuration arranged in parallel vertical posture.

Inasmuch as the details of the printed circuit board 104 will be described in greater detail hereinbelow it is not necessary to list the various elements contained thereon at this point in the description. It is sufficient to note that light generating elements such as small incandescent bulbs and L.E.D.'s are mounted on the printed circuit board for purposes of generating light and directing the same through the aforenoted openings in the foam elements for purposes of illuminating limited portions on the sheet 70 corresponding to various vertebrae, organs and sections of the nervous system. Finally, there is illustrated in FIG. 4 a computer component 106. This is an essential component of the visual display device of the invention which controls the automated illumination of the various sections in accordance with the display principles of the invention. The computer performs as well various other functions which will be explained hereinbelow. It is sufficient at this time to note that the computer is a commercially available component which can be customized according to the invention to receive power and to generate series signals to achieve the functions to be described in detail below.

Figure 5A:
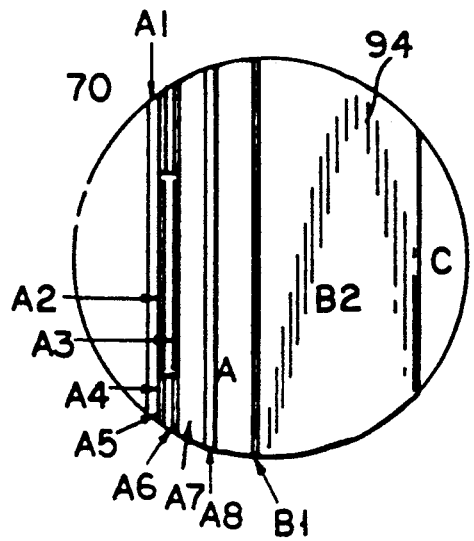
FIG. 5(a) is an enlarged view of section A appearing in FIG. 5.
Figure 5:
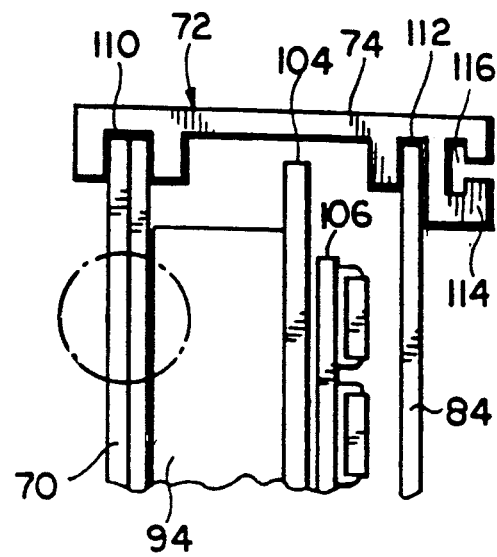
FIG. 5 is a fragmentary view in cross-section showing the general structural layout of the physical components of the display apparatus of FIGS. 1-4.

In FIG. 5 is illustrated the chart bearing sheet 70, the foam element 94, the printed circuit board 104, and the backboard 84. The sheet 70 is accommodated in groove 110 provided in the top section 74 of the casing 72. The backboard 84 is accommodated in groove 112 in top section 74. There are corresponding grooves provided in the bottom of the casing 72 as well as in the sides. The casing is provided with a strengthening element 114 provided with a recess 116 by means of which the casing can be suspended on a wall or the like.

FIG. 5(a) shows the section A of FIG. 5 on enlarged scale. Therein appears the foam element 94 and the front sheet 70. Also appearing in this view are a thin polycarbonate sheet A1, the membrane shorting pad A2 printed on the back surface of the sheet A1, and the switch surface A3. A5 is spacer material. Adhesive A4 is positioned between the polycarbonate sheet A1 and the spacer A5. Adhesive A6 is between Spacer A5 and the printed membrane switch panel A7. A layer A8 of adhesive is provided between acrylic panel A9 and the printed membrane switch panel A7. B1 indicates an adhesive applied to the foam element 94.

Figure 6:
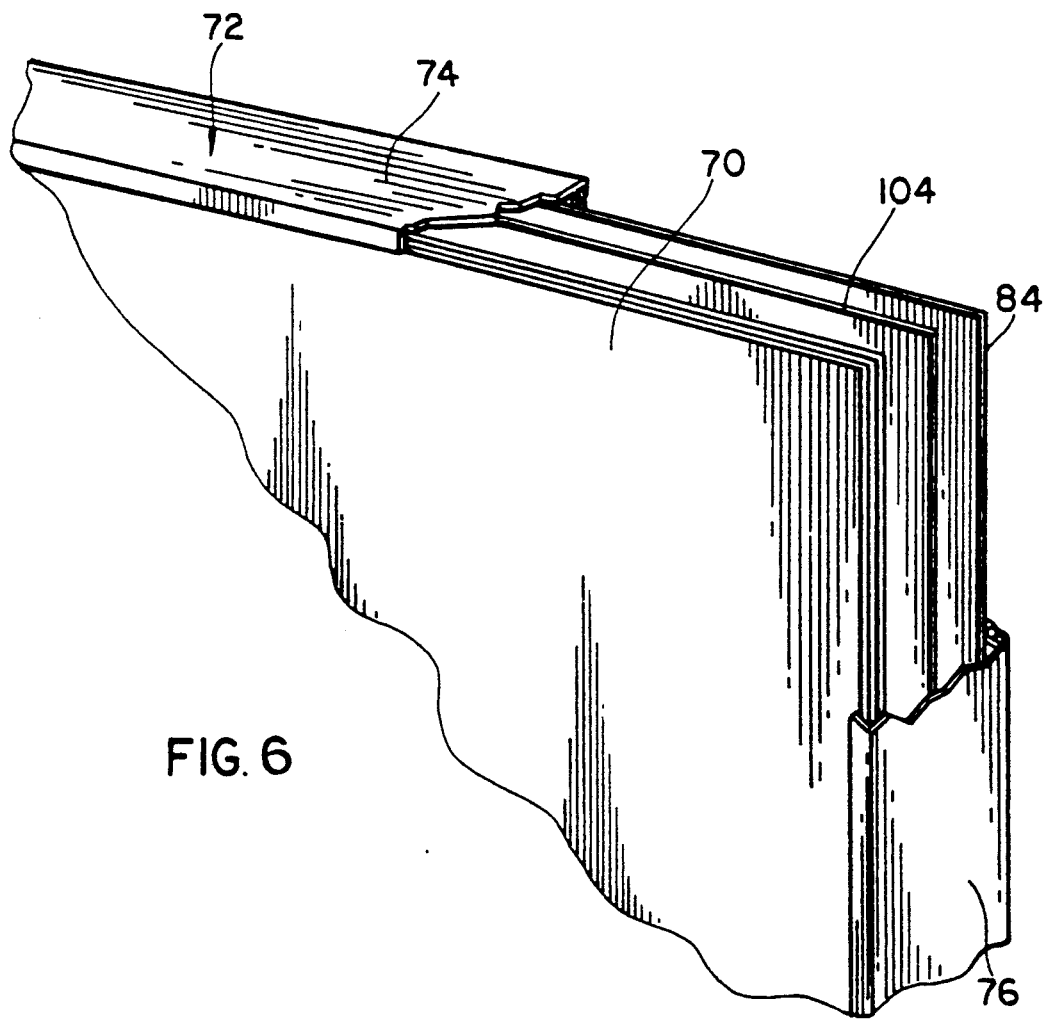
FIG. 6 is a fragmentary view illustrating the arrangement of vertical sheets or elements constituting the display apparatus of the invention, a portion of the peripheral structure being broken away.

In FIG. 6 appear the front sheet or panel 70, the printed circuit board 104 and the back board 84. As indicated above these are accommodated in the top 74 of casing 72 and in the sides of which is seen the side 76 of casing 72.

Figure 7:
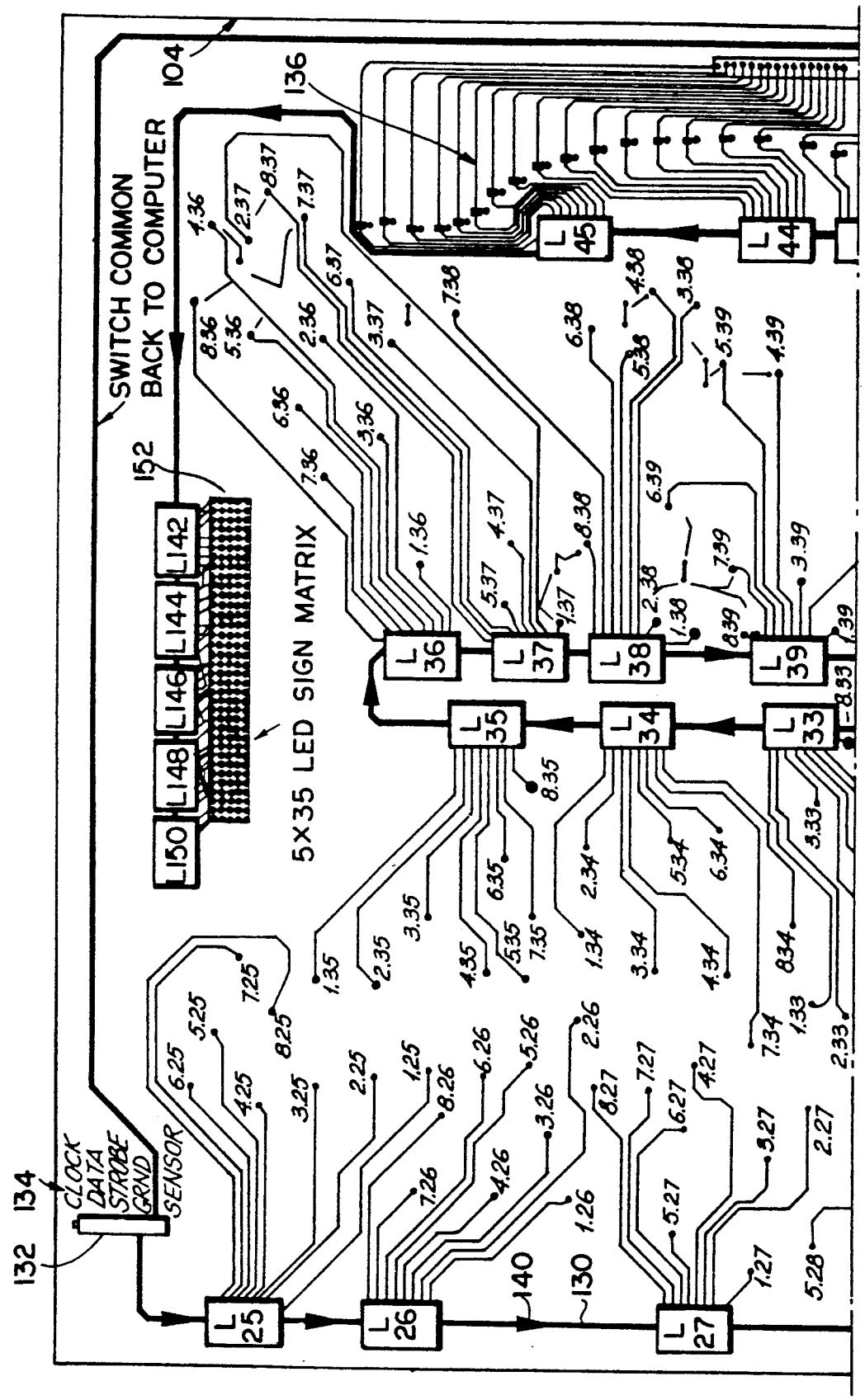
FIG. 7 is a plan view partially diagrammatic illustrating a printed circuit board constituting one of the sheets appearing in FIGS. 5 and 6.
Figure 7:
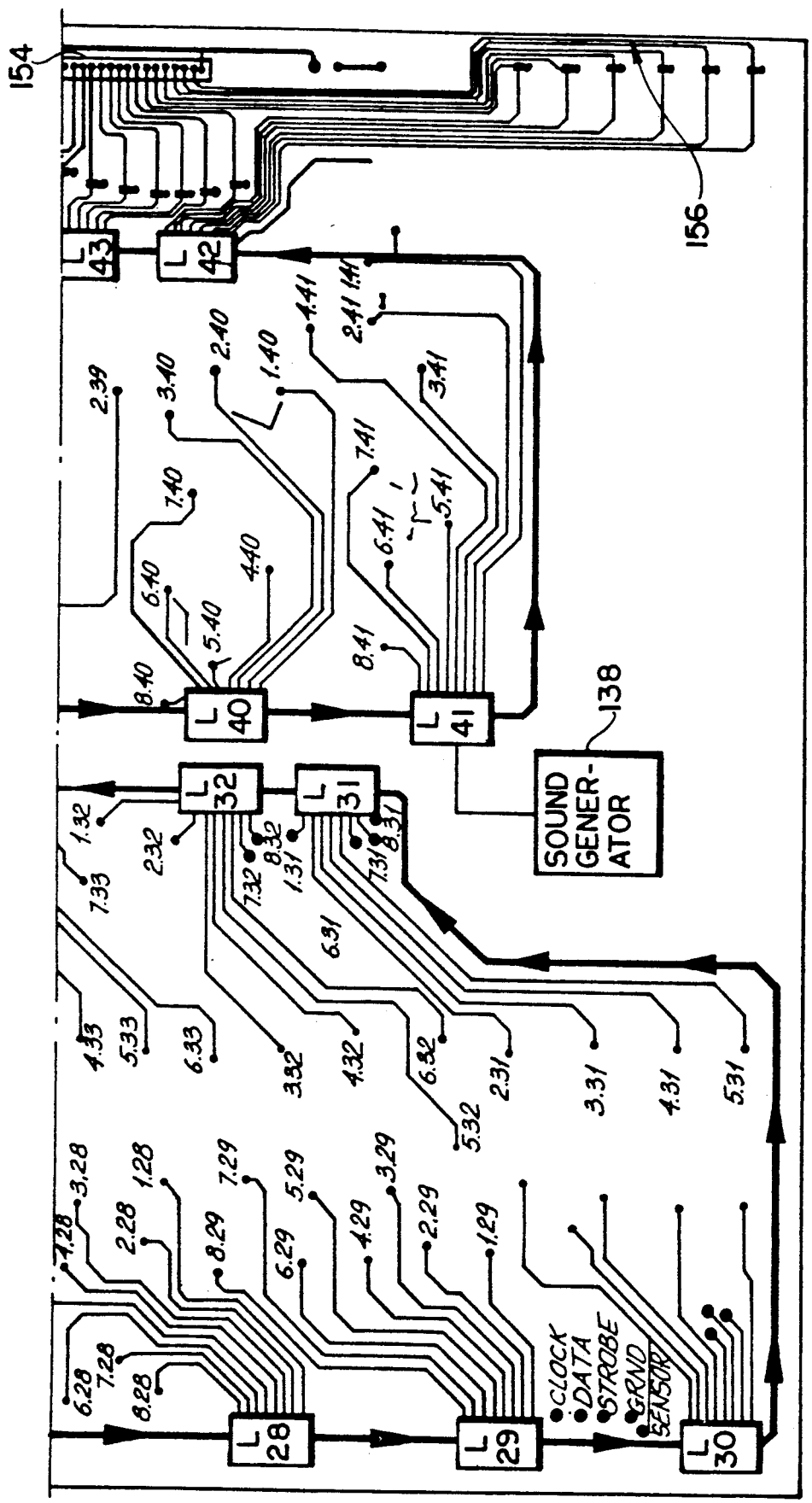

Views of the details of printed circuit board 104 appear in FIGS. 7 and 7(a). Therein appear a plurality of electronic latches L25-L45 connected in series. These latches may be, for example, commercially available latches such as the SPRAGUE UCN5821A. These latches are connected in series as indicated by circuit 130 which connects with the computer input indicated at 132, this being the input derived from the computer 106 referred to above in connection With FIG. 4. This computer can be a commercially available Z80 type computer, the outputs of which are the clock, data, strobe, ground and sense (input) signals indicated at 134.

Latch L25 is connected by wiring to 4 volt incandescent light bulbs 1,25; 2,25; 3,25; 4,25; 5,25; 6,25; 7,25; and 8,25. According to the output of latch L25, these incandescent bulbs may be selectively illuminated individually or in any sequential arrangement controlled by the computer 106 to constitute movies as will be discussed in greater detail hereinbelow. For the present, it is adequate to note that these movies are constituted by sequentially activated light generating elements in such a manner as will give the impression of movement of light sources.

By way of further example, latch L26 is connected to incandescent bulbs 1,26; 2,26; 3,26; 4,26; 5,26; 6,26; 7,26; and 8,26. Similarly, each of the remaining latches L27-L45 are connected to groups of light generating elements. However, one difference is that latches L42-L45 are connected to L.E.D.'s one of which is shown, for example, at 136 (the others being unnumbered), and these same latches are connected to the switch header shown at 154. Therefore, each output of these latches has a switch and a corresponding L.E.D.. It will also be noted that a sound generator 138 is shown by way of example as being connected to and thereby operated by latch L41.

Signals pass through the circuit in the direction shown by arrowheads 140. The serial signals pass eventually into a further series of latches indicated at 142, 144, 146, 148 and 150, these being connected to an L.E.D. sign matrix indicated at 152. As will be explained in greater detail hereinbelow, latches 142, 144, 146, 148, and 150 function to display characters on sign matrix 152 thereby to convey information which can be scrolled left to right, right to left and up to down or visa versa.

Indicated at 154 is a header for the switches mentioned hereinabove, these switches being capable of individually illuminating respective of the L.E.D.'s 136. The functional switches mentioned hereinabove are connected to the group of L.E.D.'s collectively indicated at 156.

It will be readily understood the L.E.D.'s at 136 are physically and positionally related to the various vertebrae on the front chart 70. Similarly the various incandescent bulbs which have been mentioned are physically and geographically related to respective of the organs and portions of the nerve system which has been mentioned hereinabove.

The operation of the switches and the latches therefore enable the illuminating of the various vertebrae, nerve system sections and organs according to the location of the various light generating elements and the transmission of light through the thin polycarbonate light transmitting layer A1 as previously mentioned relative to FIG. 5(a).

Figure 8:
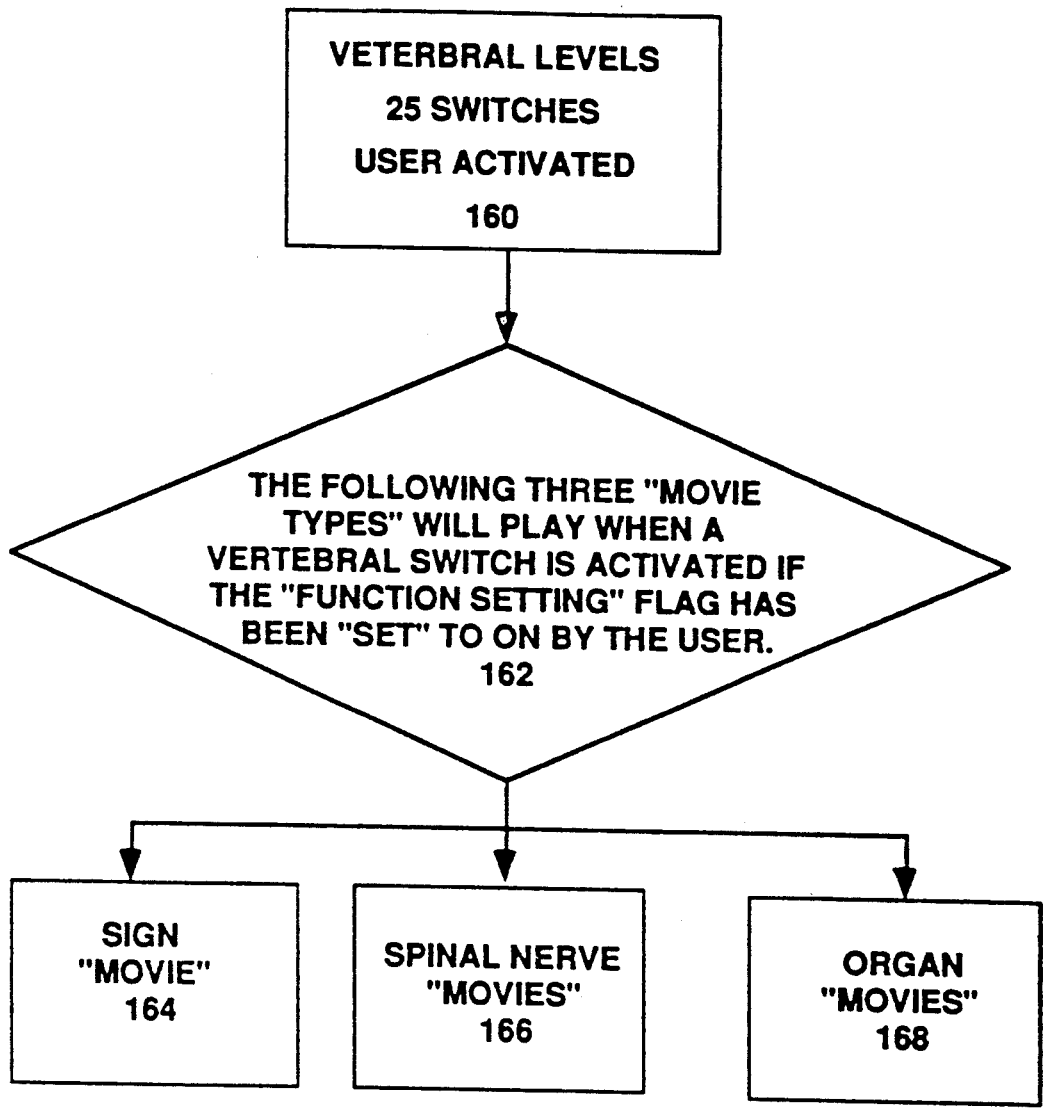
FIG. 8 is a chart illustrating some of the options available in the display apparatus of FIGS. 1-7.

FIG. 8 is a chart indicating the user activation of the twenty-five switches inclusive of C1-C7, T1-T12, L1-L5 and Sacrum at the block 160. Diamond block 162 indicates that the three movie types indicated by blocks 164, 166 and 168 will play when a vertical switch is activated if the function setting flag to be mentioned in greater detail hereinbelow has been turned on by the user. Block 164 indicates a sign movie Block 166 indicates a spinal nerve movie. Block 168 indicates an organ movie.

FIG. 9 indicates the correlation of the vertebral switches with the various sections indicated by blocks 170, 172, 174, 176, 178, 180, 182, 184, 186. Block 170 indicates the brain area, whereas block 172 indicates the phrenic area. Block 174 indicates the upper cervical area whereas block 176 indicates the brachial plexus area. Block 178 indicates the upper intercostal area, block 180 indicates the middle intercostal area, and block 182 indicates the lower intercostal area. Block 184 indicates the femoral nerve area whereas block 186 indicates the sciatic nerve area.

From the indicated connecting lines it will be seen that certain of the switches relate to a plurality of blocks and that some of the blocks are serviced by a plurality of switches. Thus for example block 170 is shown by lines 188 and 190 to be serviced by switches C1 and C2. Similarly lines 190, 192 and 194 show that switch C2 services blocks 170, 172 and 174. These correlations and the other illustrated correlations represent the present opinion of human anatomy at this time; however the arrangement can be reprogrammed for customizing purposes.

Figure 10:
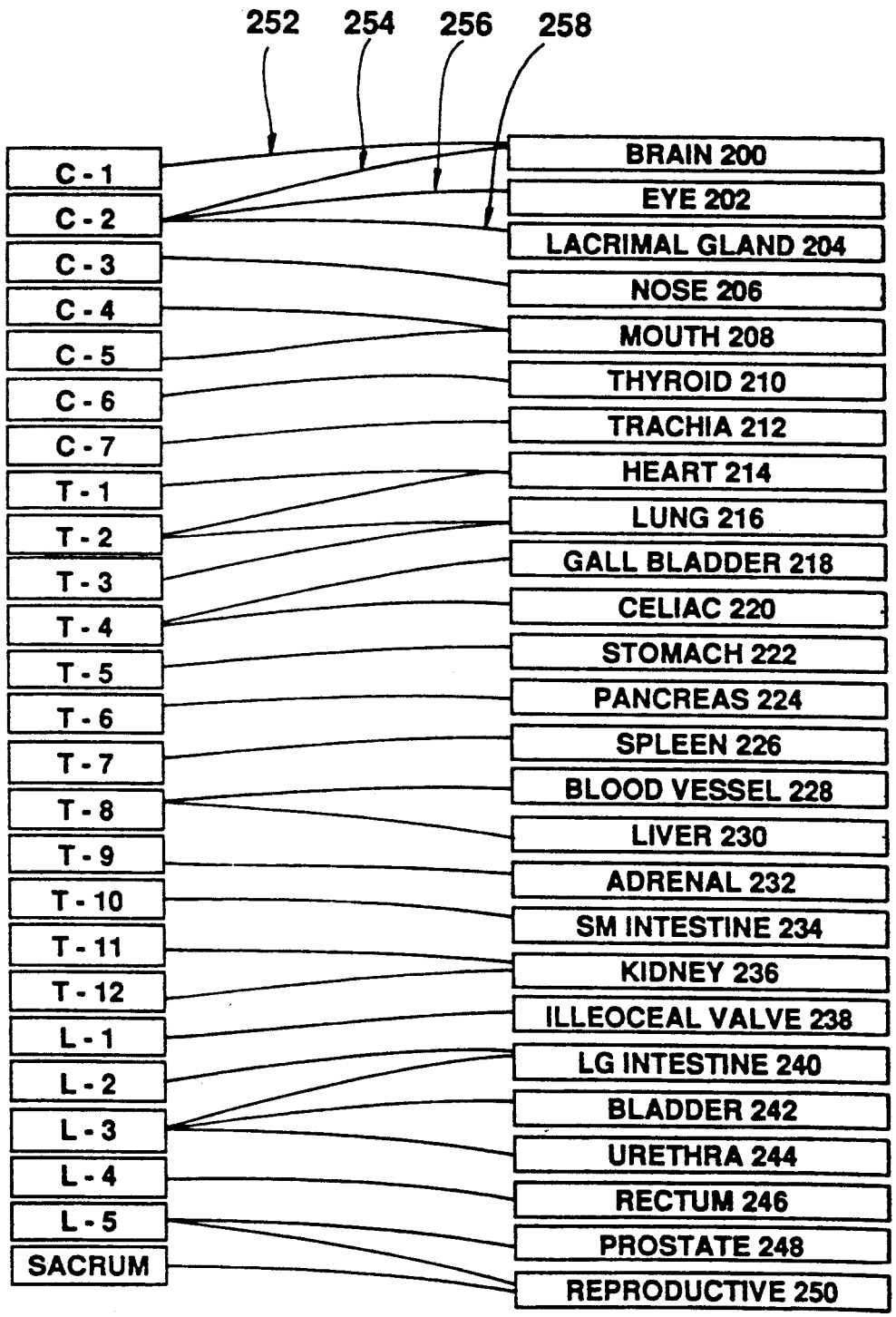
FIG. 10 is a chart corresponding to FIG. 9 showing some further options.

Whereas FIG. 9 represents correlation for spinal nerve movies, FIG. 10 illustrates correlation for organ movies. Therein are seen blocks 200-250 showing relationship of the switches to the brain, eye, lacrimal gland, nose, mouth, thyroid, trachea, heart, lung, gall bladder, celiac, stomach, pancreas, spleen, blood vessel, liver, adrenal, small intestines, kidney, illeoceal valve, large intestines, bladder, urethra, rectum, prostate, and reproductive organ. Once again, the connecting lines indicate that a single switch can cooperate with more than one of the aforementioned organs or that one organ may be serviced by more than one switch. For example, lines 252 and 254 show that block 200 is serviced by switches C1 and C2 whereas lines 254, 256, and 258 show that a single switch C2 services blocks 200, 202, and 204. These indicated correlations also represent the present opinion regarding human anatomy; however the arrangement also can be reprogrammed for customizing purposes.

Figure 11:
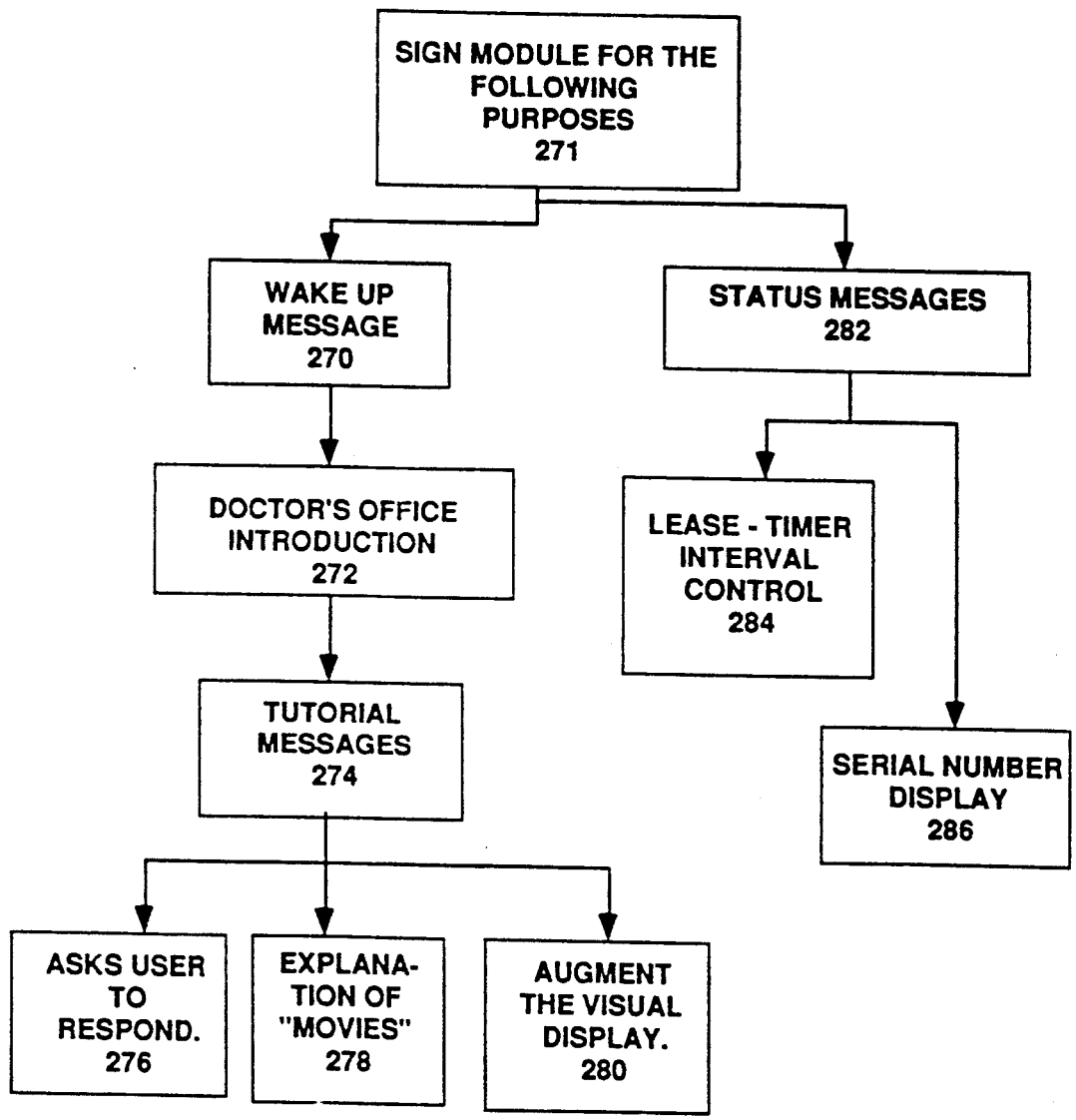
FIG. 11 is a chart illustrating some further features and options available in the apparatus of FIGS. 1-7.

FIG. 11 is a diagram showing that the sign module (see block 271) can be used for various purposes. For example, block 270 indicates that the sign module exemplified by sign matrix 152 (see FIG. 7) can be used for wake up messages. Block 272 indicates the use of the sign, by way of example, for a doctor's office introductory message. Block 274 indicates that the sign matrix can be used for tutorial messages. Through these tutorial messages the sign is operating interactively and responsively. The tutorial messages may for example be of the type indicated by block 276 which require the user of the display apparatus to respond. Block 278 indicates that the tutorial messages may be of the type to constitute explanation of the movies. Block 280 indicates that the messages may be used to augment the visual display.

On the other hand the block 282 indicates that the sign matrix can be used with respect to status messages. Block 284 indicates that the sign matrix can be used for lease-timer, interval controls as will be discussed in greater detail hereinbelow. Block 286 indicates that the sign matrix can be used for serial number display (thereby identifying the specific apparatus involved).

As has been noted hereinabove, the sign matrix or module is for example made up of L.E.D.'s. These may be arrayed in an array of thirty-five columns by five rows. With this arrangement, it is possible to display six characters and to scroll them from right to left, up to down, down to up as well as from left to right. It is also possible to make five characters appear. The display system software creates a scanning through the five horizontal rows while the 35 columns light only the L.E.D.'s being accessed through the scan. This allows the sign x-y matrixing to take place as an integral part of the other lighted areas such as for instance the spinal and autonomic nerve light bulbs and the thirty-one vertical/function L.E.D.'s.

Figure 12:
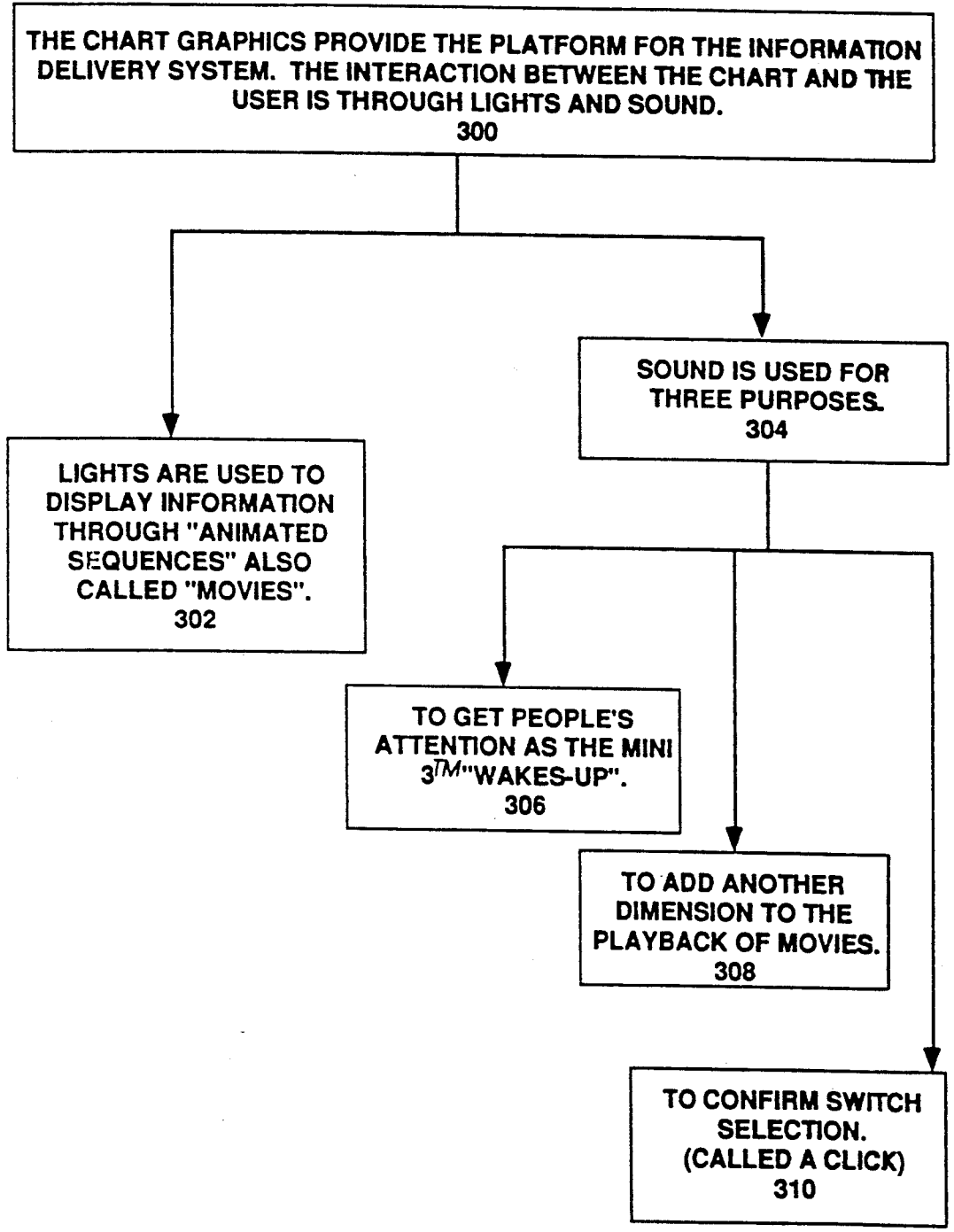
FIG. 12 is a chart illustrating still further options available in the apparatus of FIGS. 1-7.

FIG. 12 is a chart indicating the utilization of the light generating elements and sound. Block 300 therein indicates that the chart graphics appearing on sheet 70 (see FIG. 3) provide the basis for an information delivery system. The interaction between the chart and the user of the display apparatus of the invention maybe through the use of light and sound. Block 302 indicates that the lights are used to display information through direct illumination or through animated sequences which are known herein as movies. Block 304 indicates that the sounds can be used for three purposes. Block 306 indicates that the sound can be used to gain attention as the system "wakes up". Block 308 indicates that sound can be used to add another dimension to the playback of movies. Block 310 indicates that sounds can be used to confirm switch selection; in this instance the sound is designated as a click.

Figure 13:
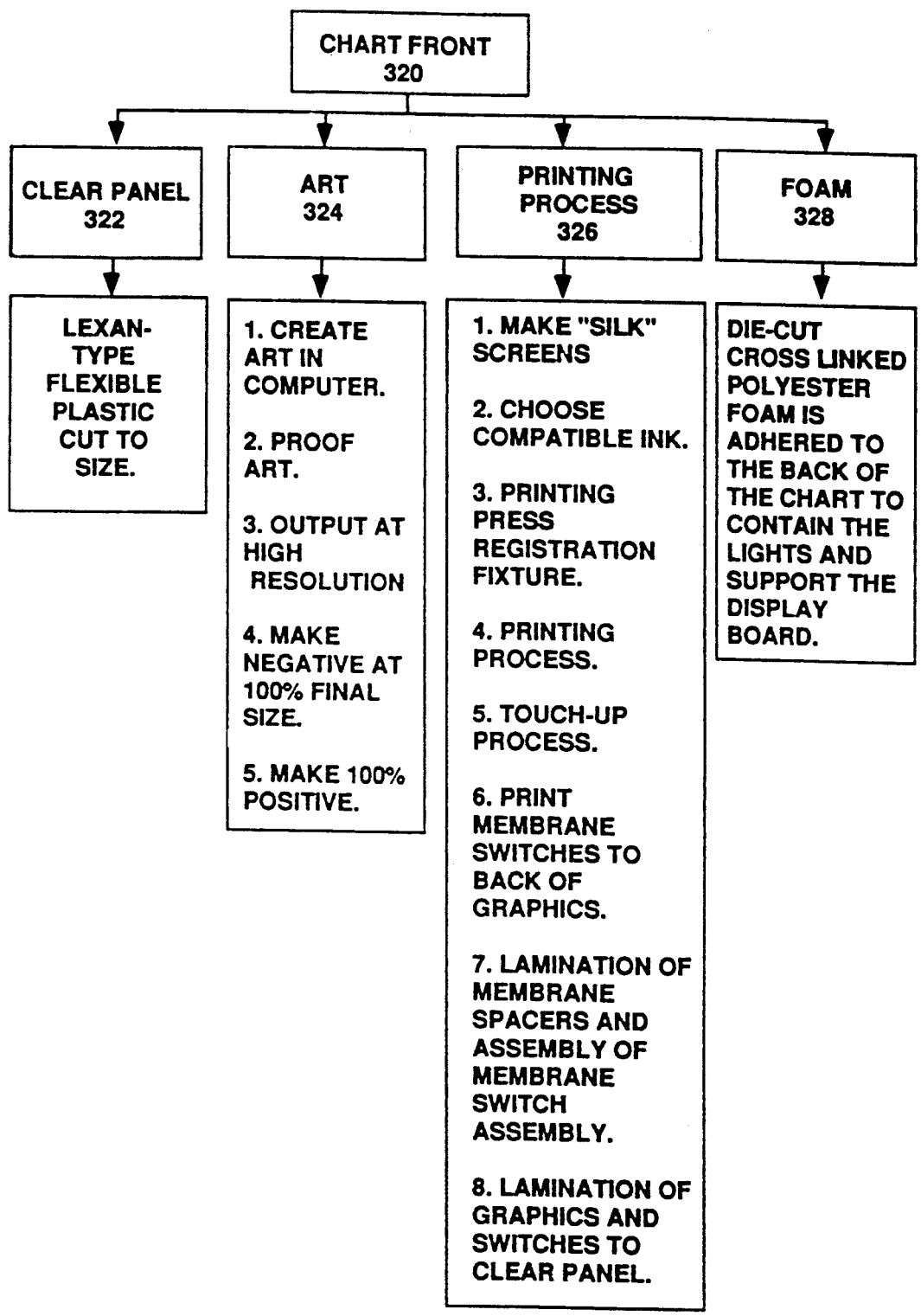
FIG. 13 is a chart illustrating the method of constructing a portion of the display apparatus.

FIG. 13 departs from the explanation of the display apparatus of the invention to indicate generally a method of manufacturing and assembling certain components thereof. In FIG. 13, block 320 indicates the chart front 70 appearing for example in FIGS. 1 and 3. Block 322 designates the clear panel and the fact that this panel is derived of Lexan-type flexible plastic cut to appropriate size.

Block 324 indicates that the art work is created in a computer, subjected to proof, and outputted at a high resolution. A negative is made at 100% of the finally desired size and a 100% positive is produced.

Block 326 indicates the printing process whereby silk screens are made with a compatible ink and with the use of a printing press registration fixture. This is followed by a printing process, a touch up process and the printing of membrane switches on the back of the graphics. There then follows the lamination of membrane spacers as mentioned hereinabove and an assembly of the membrane switch assembly. The graphics and switches are laminated to a clear panel.

Block 328 indicates the utilization of foam elements as has been discussed hereinabove. A cross-linked polyester foam for example is die-cut and is adhered to the back of the chart to contain and limit the lights and to support the display board.

Figure 14:
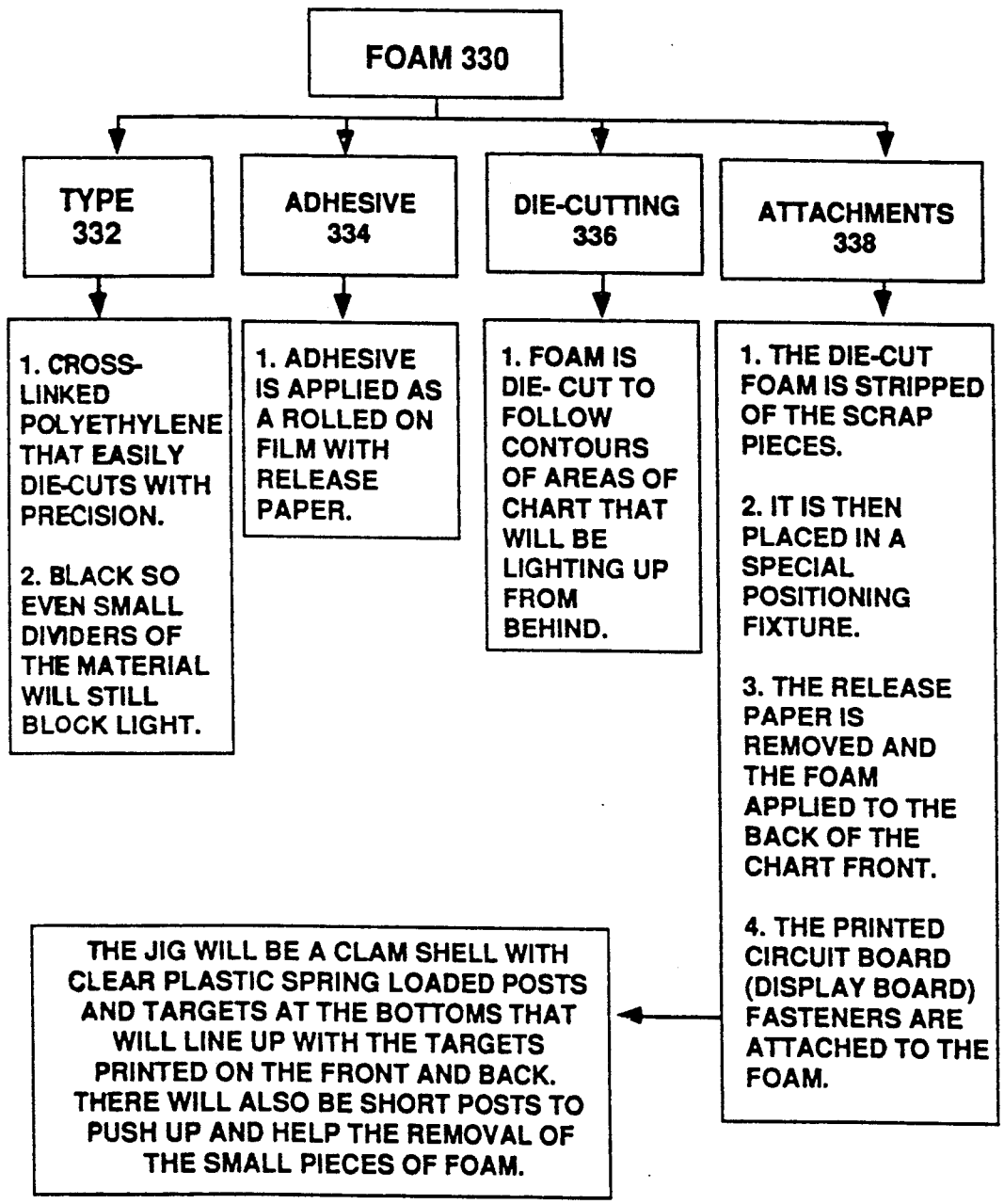
FIG. 14 is an additional chart illustrating the manufacture of a portion of the apparatus of the FIGS. 1-7.

FIG. 14 illustrates at block 330 the utilization of foam to produce elements to contain the light generated by the light generating elements. Block 332 indicates the selection of the type of foam which is preferably a cross-linked polyethylene that die-cuts easily and with precision. It is preferably of a black color so that even small dividers of the material will block light.

Block 334 indicates the utilization of an adhesive. The adhesive is applied as a rolled-on film with release paper. Block 336 indicates the die-cutting operation whereby the foam is die-cut to follow the contours of the area of the charts that will be lighting up from the light generated by the light generating elements.

Block 338 indicates the attachments whereby the die-cut foam elements are stripped of scrap pieces with the elements then being placed on a positioning fixture. The release paper is removed and the foam is applied from the back of the chart front. Thereafter, the printed circuit board fasteners are attached to the foam. A jig is employed which will be of the clam shell type with a clear-plastic spring-loaded post arrangement and with targets being provided which are lined up by the jig with the targets printed on the front and back. Short posts can be employed to push up and help in the removal of the small pieces of foam.

Figure 15:
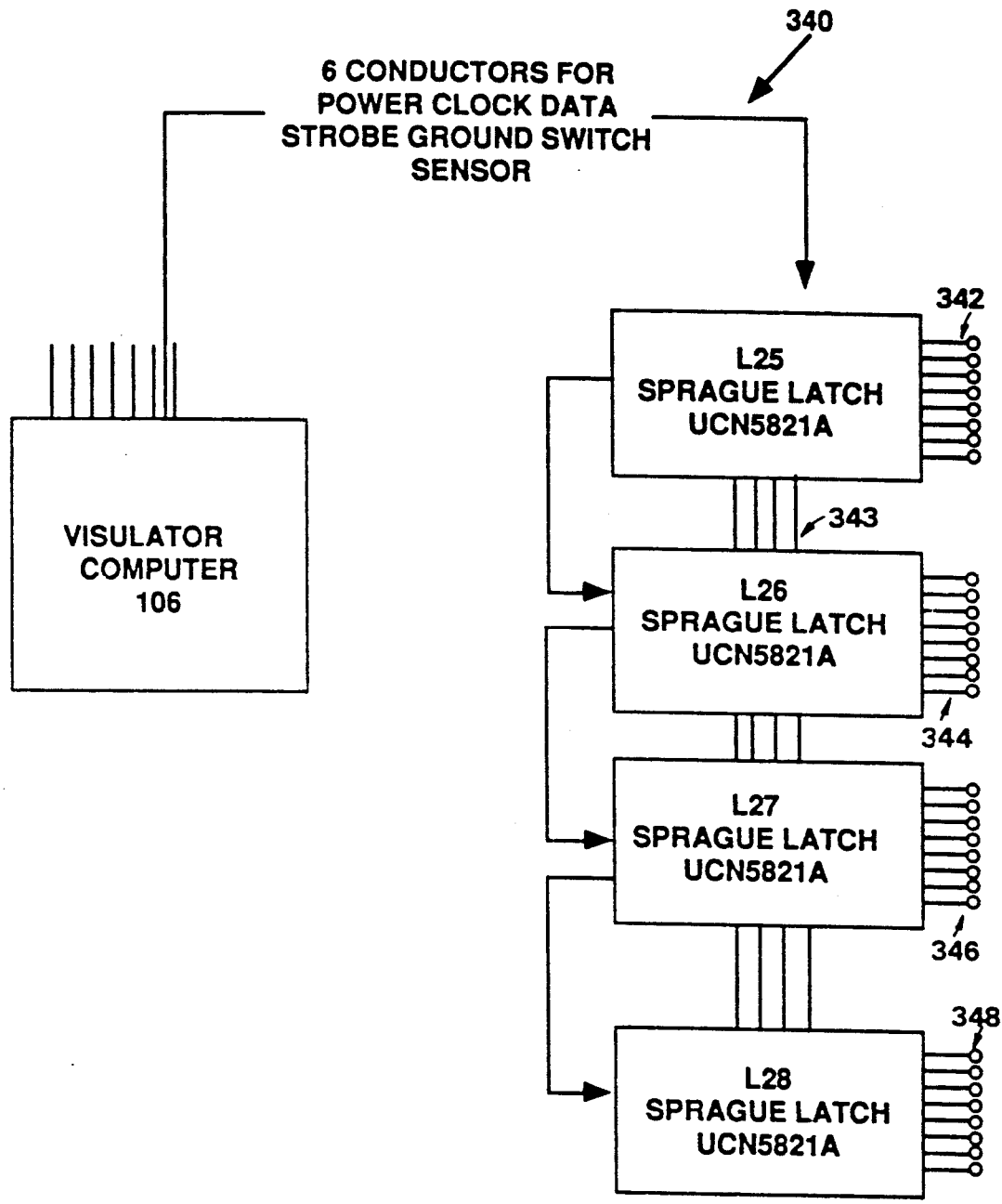
FIG. 15 is a block diagram illustrating the functioning of a portion of the apparatus of FIGS. 1-7.

Returning now to the display apparatus of the invention, FIG. 15 illustrates the linearly addressed direct-drive electronic read out. The computer 106 is indicated as being connected by six conductors respectively relating to power, clock, data, strobe, ground and switch sensor signals in the form of a cable 340. By way of example, the Z80 computer which is commercially available and employed in accordance with the invention is capable of driving up to one hundred and forty-four of the SPRAGUE UCN5821A latches connected in series. The computer is shown as being connected to latches L25-L28 connected in series for data transmission and also by parallel connections 343 for control. These latches are in turn connected to incandescent bulbs or L.E.D.'s such as for example appearing at 342, 344, 346, and 348 previously discussed in greater detail with reference to FIGS. 7 and 7(a). Each latch is capable of controlling, for example, eight outputs by decoding serial data received from the computer 106. The computer thus selects the particular lights or light generating elements which are to be illuminated thereby to control the illumination of information printed on the front chart or sheet 70 discussed hereinabove. The computer 106 may thus be programmed as will be explained in greater detail hereinbelow for purposes of running movies or displaying information according to the type of operation which is to be selected.

Figure 16:
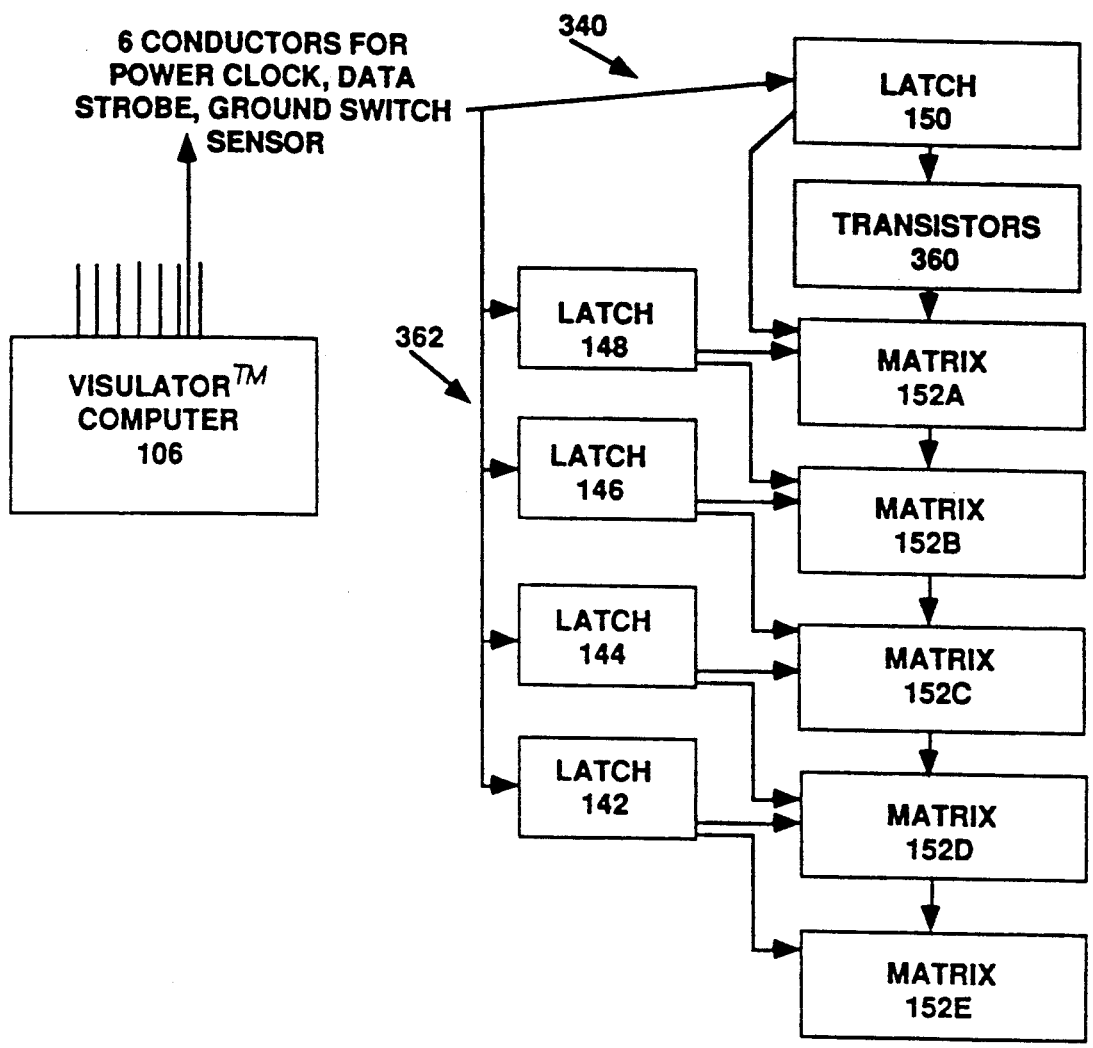
FIG. 16 is a block diagram illustrating a portion the circuitry of the apparatus of FIGS. 1-7.

FIG. 16 is a block diagram illustrating the use of the computer 106 for purposes of creating a sign movie. The computer 106 is coupled via line 340 to latch 150 and via line 362 to latches 142, 144, 146, and 148 for decoding of received signals in order to effect actuation of the matrix sections 152a, 152b, 152c, 152d and 152e to illuminate thirty-five possible L.E.D positions selectively at the intersections of the five transistor rows with seven columns. The five transistor rows are formed by a transistor circuit 360 coupling latch 150 to matrix section 152a. As shown the signals, received by matrix section 152a are received from latch 150 and latch 148. The signals received from matrix section 152b are received from latch 146 and 148. The signals received by matrix section 152c are received from latches 144 and 146; the signals received by matrix section 152d are received from latches 142 and 144; and the signals received by matrix section 152e are received from latches 142.

As has been indicated previously, the sign L.E.D.'s are arranged in 5×7 blocks of thirty-five L.E.D.'s. The matrix sections can be otherwise customized. The L.E.D.'s may be for example Hewlett Packard's HP HDSP-4703 L.E.D.'s. All of the latches used in this portion of the circuit are preferably SPRAGUE UCN5821A chips with eight outputs. Latch 150 uses five outputs to scan the five rows of the sign through transistors. The thirty-five columns are driven by the three remaining outputs of latch 150 and the total outputs of latches 142, 144, 146 and 148. The raster effect displays characters that are 5×5 with one column space therebetween.

Figure 17:
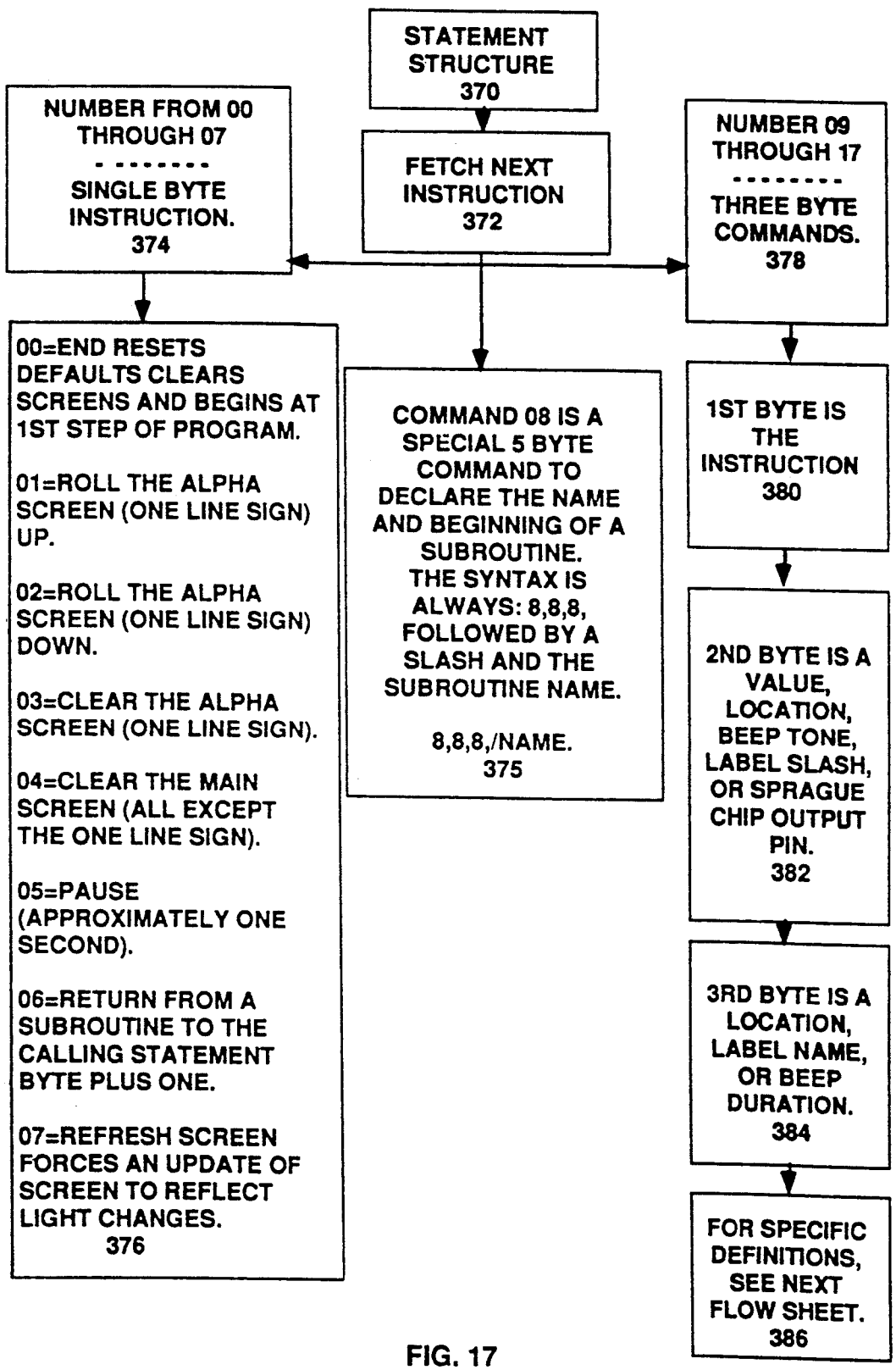
FIG. 17 is a diagram illustrating some of the software features employed in the apparatus of FIGS. 1-7.

The diagram illustrated in FIG. 17 illustrates the statement circuitry and flow of signals as indicated by block 370. The first step is to fetch the next instruction as shown by block 372. Block 374 indicates single byte instruction for numbers 00-07. As indicated in block 376, 00 represents the clearance of the screens and beginning at the first step of the program. The signal 01 equals the rolling of the alpha screen in the up direction. The signal 02 directs the rolling of the screen in the downward direction. The signal 03 directs the clearing of the sign matrix screen. The signal 04 directs the clearing of the main screen controlled by latches L25 through L45. The signal 05 directs a pause. In response to the signal 06, there is provided a return from a subroutine to the calling statement byte plus one. In response to signal 07 the refresh screen signal forces an update of the screen to reflect light changes.

As indicated in block 375 the 08 command defines the beginning of a subroutine by declaring the subroutine label name. This is a special 5 byte command.

As indicated in block 378, the numbers 09-17 provide for three byte commands. As indicated in block 380, the first byte provides the instruction. The block 382 provides for the second byte being a value, location, beep tone, label/ or Sprague chip output. The next block 384 indicates that the next byte is a location, label, name or beep duration. The next block 386 provides for specific definitions as more particularly indicated in FIG. 18.

As indicated in the chart of FIG. 18, the signal 09 places the value found in the next sequential byte into the second byte address location. The signal 10 controls to add the value found in the next byte address into the second byte address location. The signal 11 provides for copying the value found in the next byte address into the second byte address location. The signal 12 provides for comparing the first address value to the second address value. If they are equal, the next byte is executed. If the first value is less than the second, it skips to the third byte. If the first value is greater than the second then a skip is made to the fifth byte.

Signal 13 (GOTO) provides for going through the routine with the declared label name defined in the program by 8,8,8,/name. In response to signal 14 (GOSUB), the operation goes to the subroutine with the declared label name defined in the program by the 8,8,8,/name and then returns back to this poisition when a 06 is found. In response to a signal 15, the operation sets a bit-turn on the light at pin x of the Sprague chip yy. In response to signal 16, the operation resets a bit-turn off the light at pin x of Sprague chip yy. In response to signal 17, a beep is played with respect to a particular frequency and duration.

Figure 19:
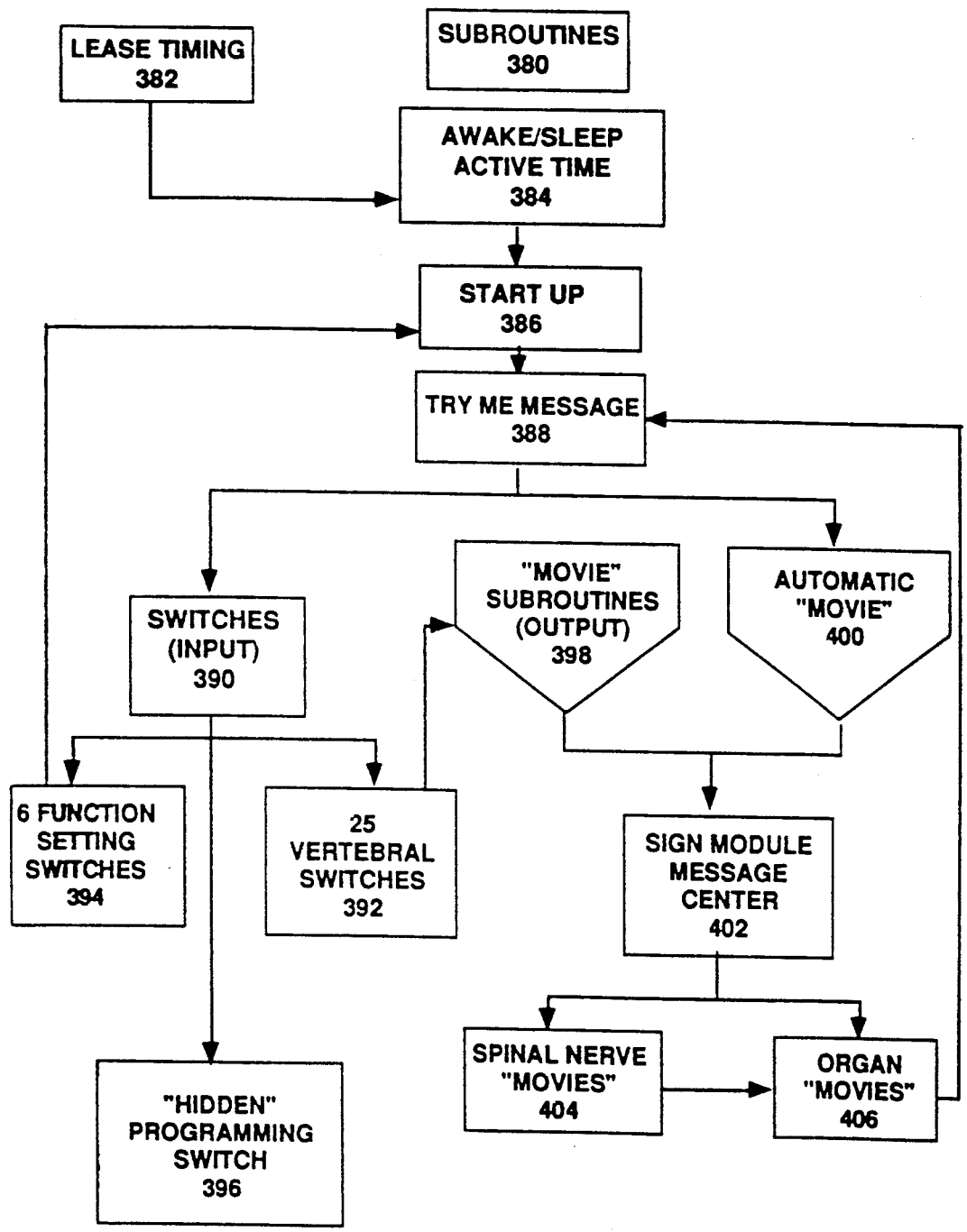
FIG. 19 is a flow chart illustrating some of the options available in the apparatus of FIGS. 1-7.

FIG. 19 shows various subroutines capable of being performed by computer 106 of the display apparatus of the invention. Block 380 indicates that subroutines appear in FIG. 19. Block 382 indicates the lease timing subroutine as performed in accordance with block 384 which indicates the awake/sleep active times which control the start up of block 386 and the "try me" message of block 388. The "try me" message is simply a message to the user indicating the possibility or option of trying a particular subroutine.

The utilization of switches indicated at block 390 which indicates that the user can use the twenty-five vertebral switches as appears in block 392 or the six function setting switches as indicated in block 394. Block 396 indicates the possibility of using a concealed programming switch 396 which enables the switching of the switches between programming and direct utilization.

Block 398 indicates the possibility of selecting movie subroutines. Block 400 indicates the possibility of using an automatic move subroutine. Block 402 indicates the possibility of utilizing signs or messages in connection with the automatic movies or movie subroutines. Block 404 indicates the possibility of providing spinal nerve movies whereas block 406 indicates the possibility of providing organ movies.

The utilization of organ movies means that light sequencing can occur with respect to the organs. The spinal nerve movies indicates that movies may be provided in the form of light sequencing with respect to the spinal nerves. Thus, for example, the movies may be programmed to occur from nerve section to nerve section or serially through a specific nerve section by the sequencing of lights therethrough.

Figure 20:
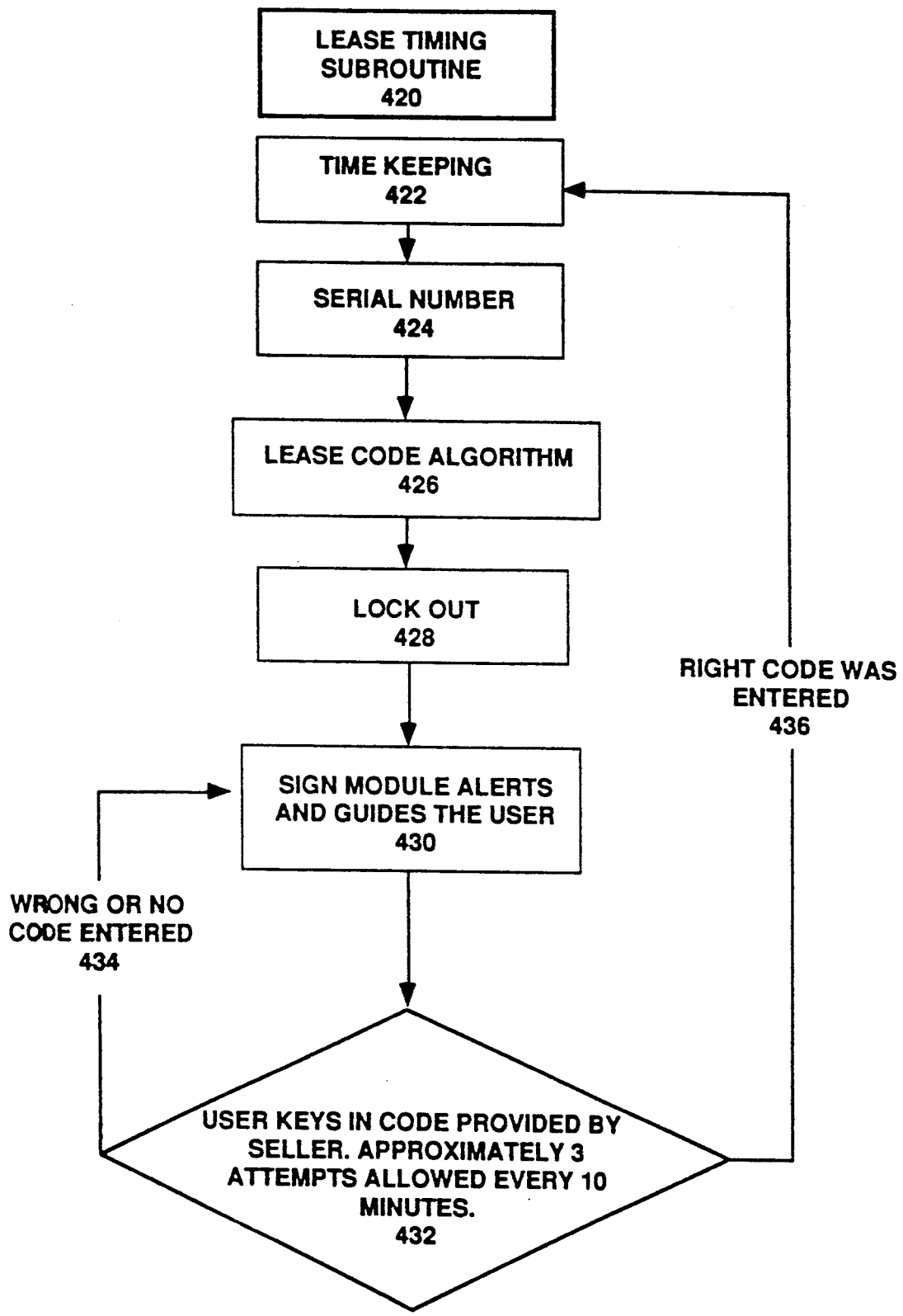
FIG. 20 is a further flow chart illustrating an additional option available in the apparatus of FIGS. 1-7.

FIG. 20 indicates at block 420 that this chart refers to a lease timing subroutine. Block 422 indicates the keeping of time preferably by the use of the clock signal referred to hereinabove. Block 424 indicates the utilization and display of a serial number relating to the particular display apparatus for identification thereof. Block 426 refers to the utilization of a lease code algorithm. Block 428 refers to the possibility of locking out the performance of the computer and circuitry of the display apparatus of the invention. In block 430 is indicated that the sign module alerts and guides the user through visual perception of the sign provided therein. The diamond block 432 indicates that the user can key in a code provided by the owner of the display apparatus who is leasing the same. Approximately three attempts for example may be allowed every ten minutes or during like time periods. Line 434 indicates that the wrong code or no code has been entered thereby locking out the performance of the computer circuitry as indicated in block 428. Line 436 indicates that the right code has been entered thereby permitting continued time keeping as per block 422 and a continuation of the display apparatus. In actual operation, the proper code may be provided to the user or the lessee of the apparatus by the lessor upon payment of a payment of an appropriate fee.

Figure 21:
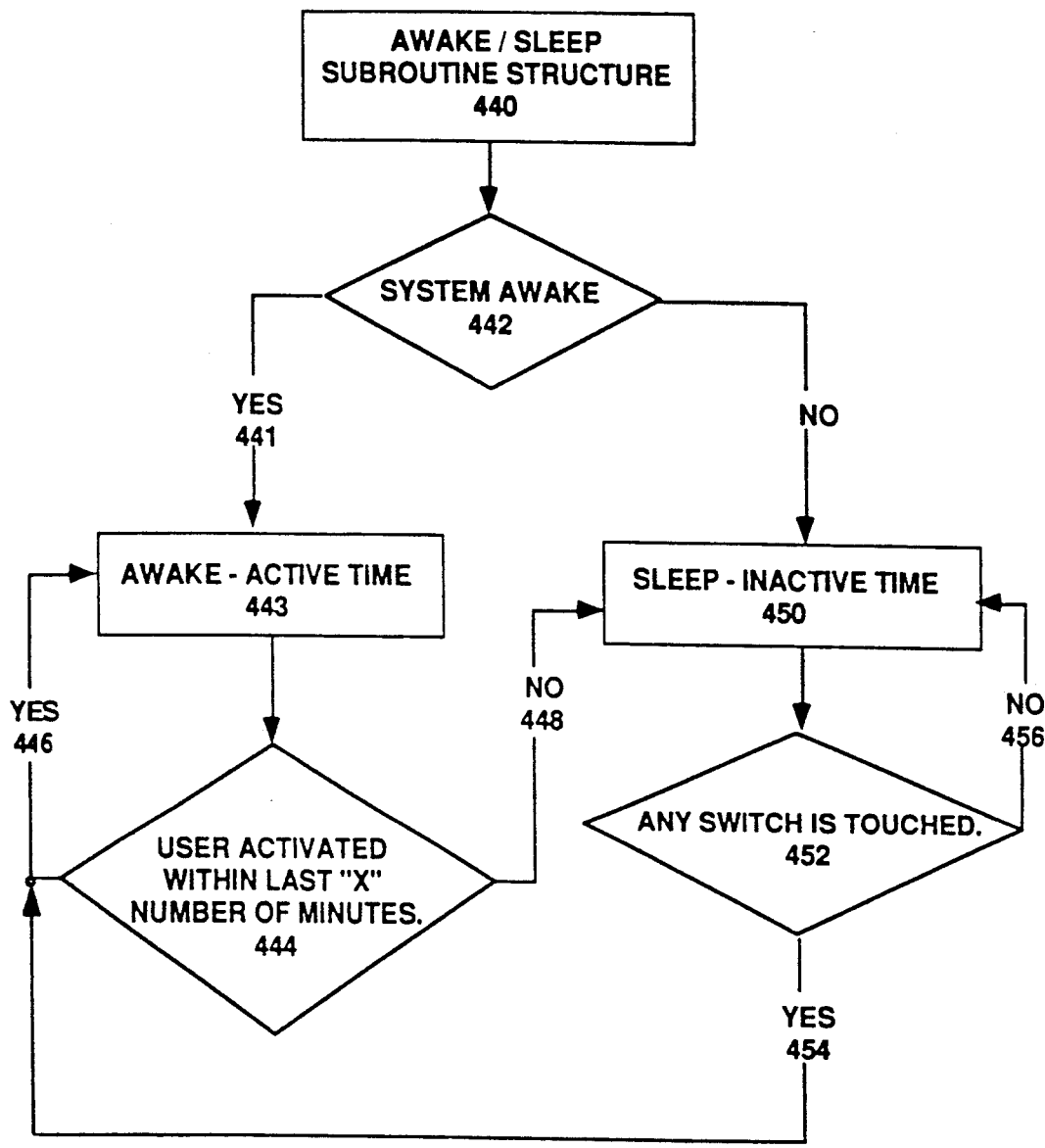
FIG. 21 is a flow chart of still another option available in the apparatus of FIGS. 1-7.

FIG. 21 indicates as shown in block 440 that this chart relates to awake/sleep subroutine structures which merely means operating or nonactive states of the display apparatus being described. Diamond block 442 indicates the awake status of the apparatus. If awake as indicated by line 441, the awake status or active time of the apparatus is indicated by block 443. The diamond shaped block 444 indicates that the apparatus has been used in the last "x" number of minutes. If such a use has occurred, line 446 feeding back to block 442 continues the active status of the apparatus. If such a use has not occurred then line 448 indicates at block 450 that an inactive time or sleep status of the apparatus is to be effected. If during that time any switch of the apparatus is touched as indicated by block 452, line 454 indicates the creation of an active period. If no switch has been touched then line 456 indicates that an inactive period or sleep status is in effect.

Figure 22:
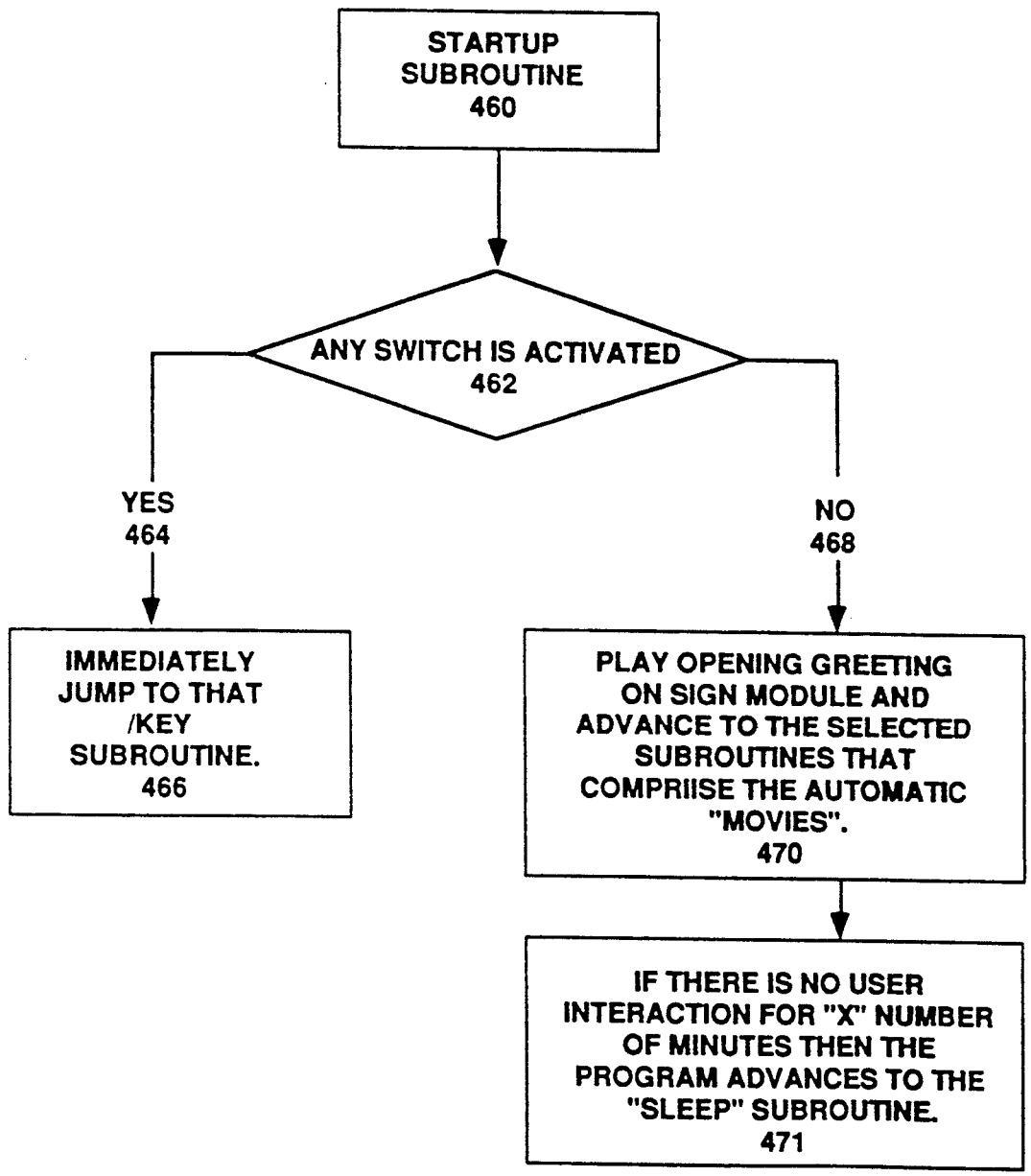
FIG. 22 illustrates still another option which is available in the apparatus of FIGS. 1-7.

FIG. 22 is a chart relating to a start up routine as indicated in block 460. If any switch is activated as indicated in diamond block 462 and as is promulgated through line 464, an immediate jump is provided through the key subroutine as indicated in block 466. If no switch has been activated as indicated by line 468 an opening greeting is provided in the form of a message in the sign module and an advance is provided to the selected subroutines that comprise the automatic movies as indicated in block 470. If still no switch is activated for a certain period of time while the automatic movies are running, then the program advances to the sleep subroutine as seen from block 471.

Figure 23:
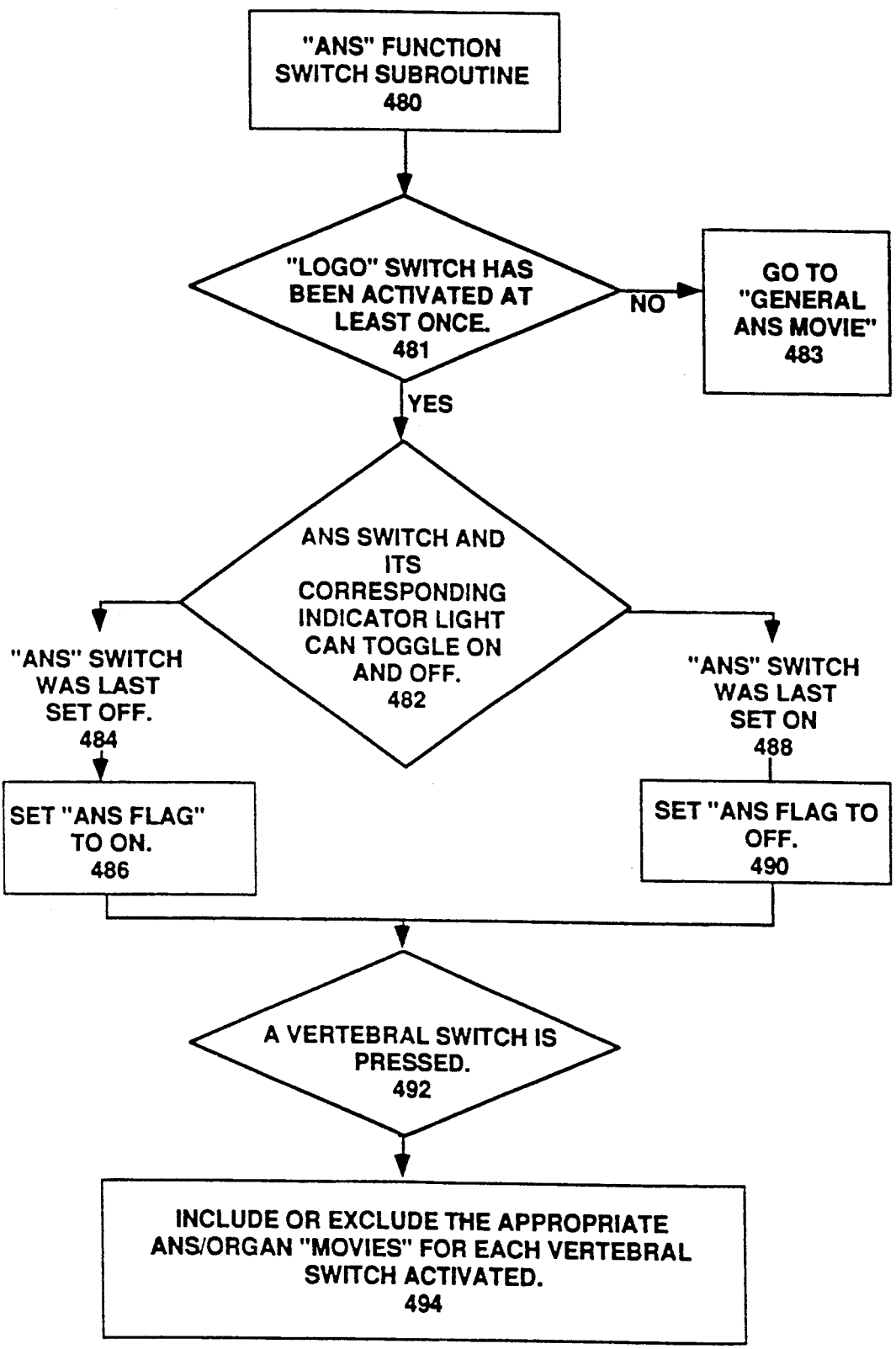
FIG. 23 is a flow chart illustrating still another option available in the apparatus of FIGS. 1-7.

FIG. 23 is a chart indicating the ANS function switch subroutine as shown by block 480. As has been indicated above, ANS refers to the autonomic nerve system. This is that portion of the nerve system that controls the function of the viscera or organs and glands. Diamond block 481 checks to see if any level of logo switch preference is active. If it is not in a preference mode then a special automatic movie related to the ANS is played as shown by block 483. If the logo preference mode is active then Diamond block 482 indicates that the switch and its corresponding indicator light can toggle on and off. If the ANS switch was last set to an off position as indicated by line 484, the ANS flag is set to on as shown by block 486. If the ANS switch was last set to an on position as indicated by line 488, the ANS flag is set to off as shown by block 490. Thereafter a vertebral switch may be pressed by the user as indicated by block 492 and the including or the excluding of the appropriate ANS/organ movie for each vertebral switch activated is indicated by block 494.

Figure 24:
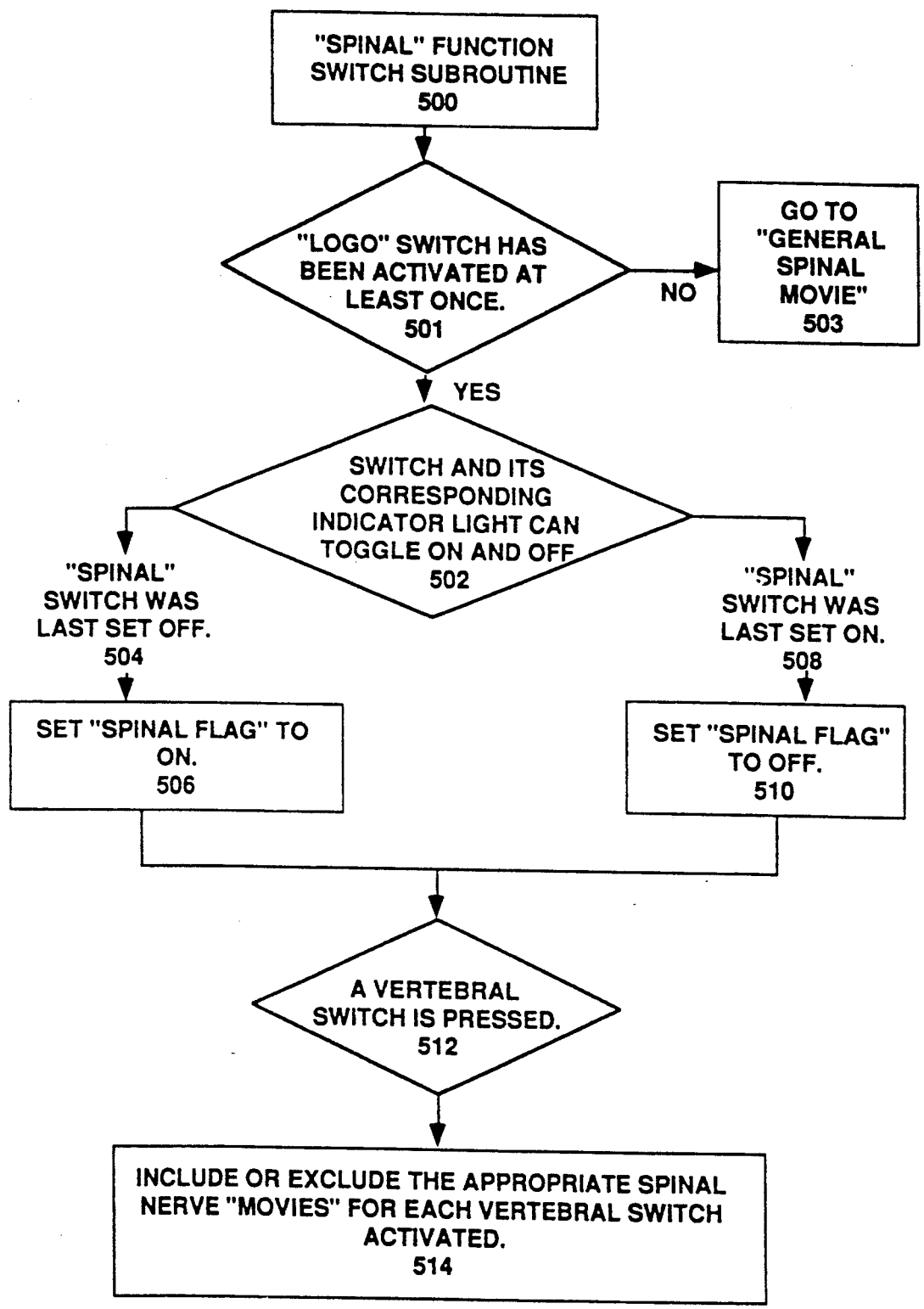
FIG. 24 is a flow chart illustrating a further option available in the apparatus of FIGS. 1-7.

FIG. 24 indicates the spinal function switch subroutine as indicated by block 500. Diamond block 501 checks to see if any level of logo switch preference is active. If it is not in a preference mode then a special automatic movie related to the Spinal Nerves is played as shown by block 503. If the logo preference mode is active then Diamond block 502 indicates that the switch and its corresponding indicator light can be toggled to on or off positions. If the spinal switch was last set to the off position as indicated by line 504, the spinal flag is set to an on position as indicated by block 506. If the spinal switch was last set to the on position as indicated by line 508, the spinal flag is set to an off position as indicated by block 510. Thereafter a vertebral switch may be pressed by the user or operator as indicated by diamond block 512 and the operation is effected to include or exclude as appropriate spinal nerve movies for each vertebral switch activated as shown in the block 514.

Figure 25:
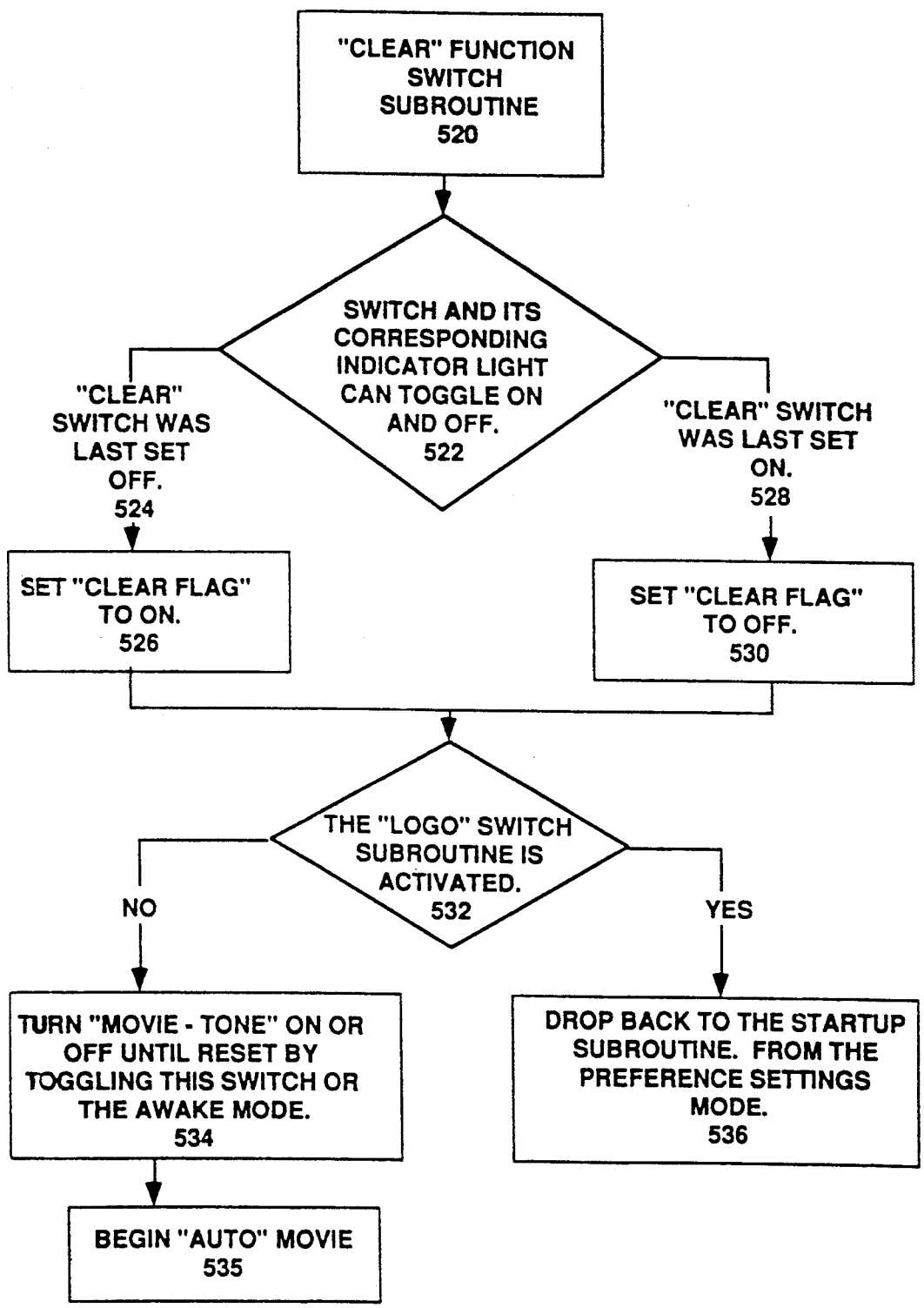
FIG. 25 is a flow chart illustrating still a further option available in the apparatus of FIGS. 1-7.

FIG. 25 illustrates the clear function switch subroutine as indicated by block 520. Diamond block 522 shows that the switch and its corresponding indicator light can toggle to the on or off positions. If the clear switch was last set to the off position as indicated by line 524, the clear flag is set to on position as indicated by block 526. If the clear switch was last set to the on position as indicated by line 528, the clear flag is set to the off position as indicated by block 530. Diamond block 532 is a check to see if a logo preference settings mode is active or not as a result of possible previous user activation. Block 534 indicates the option of turning the movie tone on or off until reset by toggling the associated switch or the awake mode. Immediately after turning the movie tone on or off the program begins the automatic movie as shown by block 535. Block 536 indicates th option of dropping back to the start up subroutine from the preference settings mode.

Figure 26:
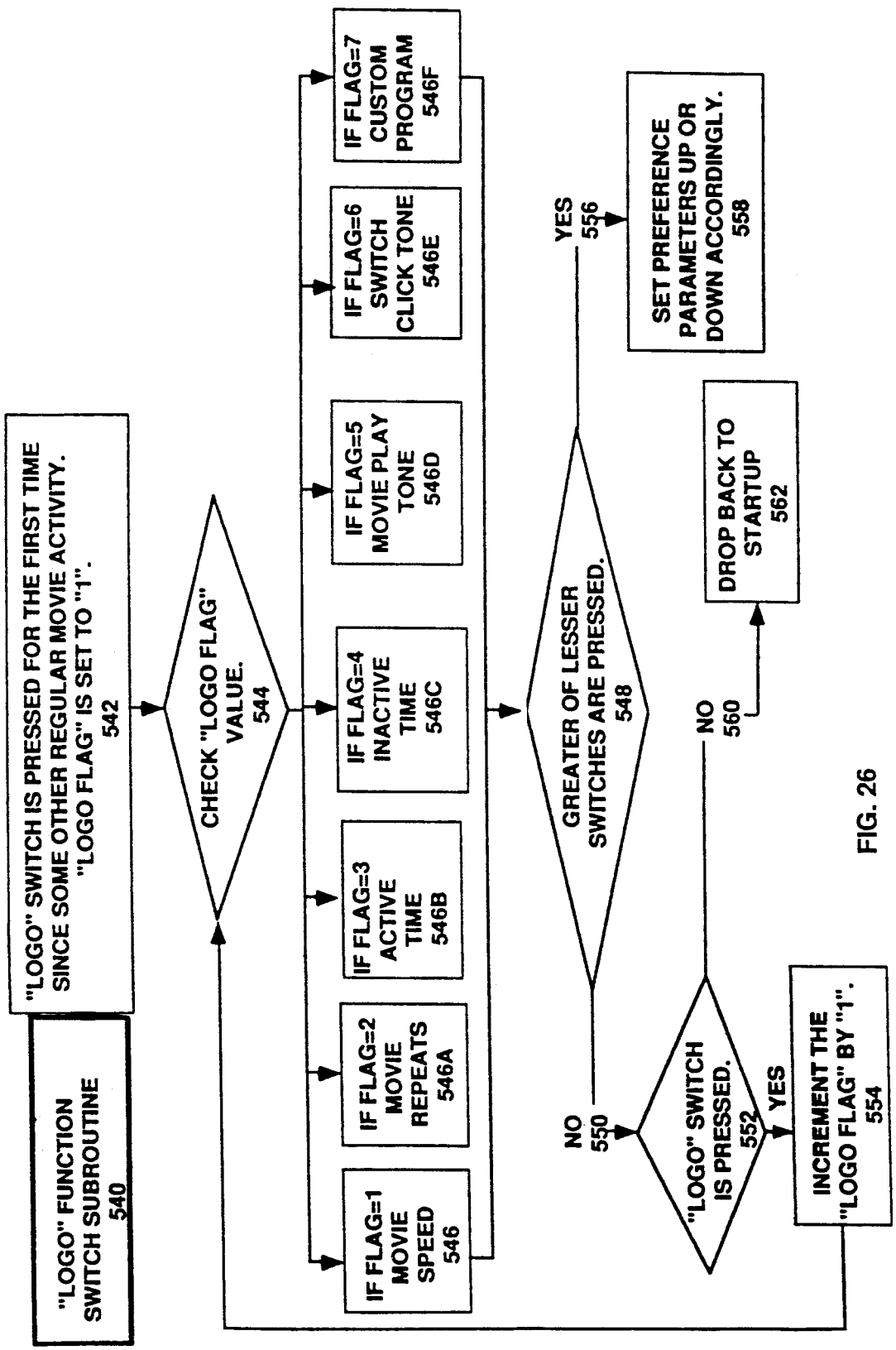
FIG. 26 is a flow chart illustrating yet further options available in the apparatus of FIGS. 1-7.

FIG. 26 illustrates the logo function switch subroutine (the logo function switch is the switch 63 illustrated for example in FIGS. 1 and 2). According to block 542, the logo switch can be pressed following some other regular movie activity and may be set to a "1" which represents an on condition. These subroutines are accessed by repeatedly touching the logo switch and watching the sign to see which preference subroutine mode is activated for setting preferences. The diamond block 544 indicates the checking of the logo flag values. According to block 546, if the flag equals "1", the preference subroutine relates to movie speed. If the flag represents the value "2", the subroutine relates to movie repeats. If the flag value equals "3", the subroutine relates to active time. If the flag value equals "4", the subroutine is inactive time. If the flag value equals "5", the subroutine relates to movie play tone. If the flag equals the value "6", the subroutine relates to switch "click" tone. If the flag equals the value "7", the preference is a custom program. The values of the flag of "2" through "7" appear in blocks 546-546f.

Diamond block 548 indicates that the greater or lessor switches may be pressed by the user or operator. These switches are the switches 64 and 65 appearing in FIGS. 1 and 2. If these switches are not pressed as indicated by line 550, the logo switch 63 may be pressed as indicated by block 552. The logo flag is incremented by one as indicated by block 554. If the greater or lessor switches are pressed as indicated by line 556 preference parameters are set up or down accordingly as shown by block 558. If the logo switch is not pressed as indicated by line 560, the operation drops back to start up as indicated at block 562.

FIG. 27 indicates the greater than function switch subroutine as indicated by block 570. The greater than subroutine is totally dependent on which preference subroutine mode is activated. Block 572 indicates that the logo switch determines which subroutine will be effected by this switch. Block 57 indicates the option of movie speed with block 576 indicating the option of setting it faster. Block 578 indicates movie repeats with block 580 indicating the increase of the repeats. Block 582 indicates the active time option with block 584 indicating increasing the awake period. Block 586 indicates the inactive time subroutine with block 588 indicating that this time can be increased. Block 590 indicates the utilization of movie play tone with block 592 indicating that the play tone can be set to a higher frequency. Block 594 indicates the switch click tone option with block 596 indicating a higher click tone option. Block 598 indicates a custom program option with block 600 indicating a step forward program.

Diamond block 602 indicates that the timer awaits another activation of either the greater-than or less-than or logo switches. Line 604 is a feedback line indicating that the greater-than or less-than switches have been activated. Line 606 indicates the activation of the logo switch and block 608 indicates an advance to the next preference subroutine. Line 610 is a time-out line and block 612 indicates dropping back to start up.

FIG. 28 is a chart indicating a less-than function subroutine as appears in block 620. The less-than subroutine is totally dependent upon which preference subroutine mode is activated. Block 622 indicates that the logo switch determines which subroutine will be effected by this switch. Block 624 again indicates movie speed with block 626 indicating the option of setting it to a slower speed. Block 628 indicates the movie repeats subroutine with block 630 indicating the option of decreasing the repeats. Block 632 indicates the active time subroutine with block 634 indicating a shorter active time. Block 636 indicates the inactive time subroutine with block 638 indicating the option of making the inactive time shorter. Block 640 indicates the movie play tone with block 642 indicating utilization of a lower tone. Block 644 indicates the switch click tone with block 646 indicating a lower switch click tone. Block 648 indicates the custom program subroutine with block 650 indicating the option of stepping back the custom program.

Diamond block 652 indicates that the timer is awaiting the activation of either the greater-than or less-than switches or the clear or logo switches. Line 654 is a feedback to the block 652. Line 656 indicates the activation of the logo switch with an advance to the next preference subroutine being indicated at block 658. Line 654 indicates that the greater-than or less-than switch has been activated. Line 660 indicates the time-out or clear switch activation with block 662 indicating dropping back to start up.

The following program material is a translation of codes which may be employed. A movie program is initially indicated as follows:

/STARTUP - SUBROUTINE
    Initialize original comparative variables.
    CHECK and maintain PREFERENCE SETTINGS
        "Movie" Sound On or Off
        "Switch Click" Sound On or Off
        "Movie" Speed
        "Movie" Repeats
        "ANS" On or Off
        "Spinal" Nerves On or Off
        Pause Time
        Initialize 3 Level Loop Timers
    PLAY the "Awake" sounds
    SIGN MESSAGE
        "WELCOME TO DR ................'S OFFICE. WE SPECIALIZE IN ..............
        . WOULD YOU LIKE TO KNOW MORE ABOUT YOUR SPINE?
        PLEASE TOUCH A VERTEBRAL SWITCH ON THE FRONT."
    GO TO /TRY ME /TRY ME - SUBROUTINE
    SIGN MESSAGE
        "TRY ME ....... TOUCH ANOTHER SPINAL SWITCH"
    REPEAT /TRY ME FOR APPROXIMATELY 3 MINUTES
        If it TIMES OUT then GO TO /STARTUP /CLEARBODIES - SUBROUTINE
    Turn OFF all lights and LEDs in the Bodies but keep on the LEDs of the 6 FUNCTION
    Switches that should be on.

RETURN TO THE CALLING ROUTINE.

/AUTOMATIC - SUBROUTINE
    GO SUB to each Vertebral Switch Subroutine one at a time then
    RETURN to beginning of /AUTOMATIC unless another Switch
    activation interrupts the operation.

'************* The following 7 Keys are Function / Programming Switches

/HIDDEN Programming Switch - SUBROUTINE - /KEY25
    GO SUB /CLEARBODIES
    IF next Switch is the "LOGO"
    CHECK the "Logo Flag" for which Preference Function is active
        If it = 1
            SIGN MESSAGE - "SPELL DR'S. NAME"
            Was LOGO Switch pressed again?
                IF Yes INCREMENT "Logo Flag" and GO TO new value
                ELSE REASSIGN Spinal Switches to alphabet.
                REASSIGN "<" to backspace
                REASSIGN ">" to space
                REASSIGN "CLEAR" to ENTER
                IF ENTER then
                STORE Dr's name.
                Await "LOGO" activation OR
                Await "HIDDEN Programming Switch" turned OFF.

ELSE If it = 2
            SIGN MESSAGE - "SPELL CLINIC'S NAME"
            Was LOGO Switch pressed again?
                IF Yes INCREMENT "Logo Flag" and GO TO new value
                ELSE REASSIGN Spinal Switches to alphabet.
                REASSIGN "<" to backspace
                REASSIGN ">" to space
                REASSIGN "CLEAR" to ENTER
                IF ENTER then
                STORE clinic's name.
                Await "LOGO" activation OR
                Await "HIDDEN Programming Switch" turned OFF.
        ELSE If it = 3
            SIGN MESSAGE - "SPELL DR'S. NAME"
            SIGN MESSAGE - "PRESS APPROPRIATE SPINAL SWITCH"

SIGN MESSAGE - "PRESS ANS OR SPINAL"
            Was LOGO Switch pressed again?
                IF Yes INCREMENT "Logo Flag" and GO TO new value
                ELSE REASSIGN Spinal Switches to alphabet.
                REASSIGN "<" to backspace
                REASSIGN ">" to space
                REASSIGN "CLEAR" to ENTER IF ENTER then
                STORE new message for chosen Subroutine.
                Await "LOGO" activation OR
                Await "HIDDEN Programming Switch" turned OFF.

ELSE If it = 4
    SIGN MESSAGE - "STACK YOUR CUSTOM AUTO MOVIE"
    SIGN MESSAGE - "PRESS SPINAL SWITCHES IN SEQUENCE"
    Was LOGO Switch pressed again?
        IF Yes INCREMENT "Logo Flag" and GO TO new value
        STORE new AUTOMATIC MOVIE Subroutine.
        REASSIGN "CLEAR" to ENTER
        IF ENTER then await "LOGO" activation OR
        Await "HIDDEN Programming Switch" turned OFF.
ELSE If it = 5
    SIGN MESSAGE - "CHANGE ORGAN CORRELATION TABLE?"
    SIGN MESSAGE - "PRESS SPINAL SWITCHES IN SEQUENCE"
    Was LOGO Switch pressed again?
        IF Yes INCREMENT "Logo Flag" and GO TO new value
        AWAIT "<" to show previous
        AWAIT ">" to show next
        REASSIGN "CLEAR" to ENTER
        IF ENTER then await "LOGO" activation OR
        Await "HIDDEN Programming Switch" turned OFF.
ELSE If it = 6
    SIGN MESSAGE - "IF YOU'VE MADE PAYMENT THEN"
    SIGN MESSAGE - "INPUT YOUR SPECIAL CODE"
    SIGN MESSAGE - "WHEN DONE HIT "CLEAR""
    Was LOGO Switch pressed again?
        IF Yes INCREMENT "Logo Flag" and GO TO new value
        CODE ENTERED now
        REASSIGN "CLEAR" to ENTER
        CHECK correctness
            IF Correct
            SIGN MESSAGE - "MINI3 ™ ACTIVE."
        ALLOW three trys per 10 minutes.
        IF ENTER then await "LOGO" activation OR
        Await "HIDDEN Programming Switch" turned OFF.
ELSE If it = 7
    SIGN MESSAGE - "SERIAL NUMBER IS .................... ."
    SIGN MESSAGE - "INPUT YOUR SPECIAL CODE"
    Was LOGO Switch pressed again?
        IF Yes show hidden VISUAL ODYSSEY MESSAGE.
        Await "HIDDEN Programming Switch" turned OFF.
GO TO - /TRY ME
ELSE Jump to Subroutine accessed by Switch activation "<" Switch - SUBROUTINE - /KEY26
    GO SUB - /CLEARBODIES
    CHECK to see if LOGO is ON or OFF
        If it is presently OFF then
            ADVANCE to previous "Movie"

ELSE CHECK "Logo Flag" for which Preference Function is active
            DECREMENT the present Preference value
            SIGN MESSAGE - "Speed Slower....." or
                    "Fewer Repeats" or
                    "Awake Shorter" or
                    "Asleep Shorter" or
                    "Movie Sound Lower" or
                    "Switch Click Off"
    GO TO - /TRY ME ">" Switch - SUBROUTINE - /KEY27
    GO SUB - /CLEARBODIES
    CHECK to see if LOGO is ON or OFF
        If it is presently OFF then
            ADVANCE to next "Movie"
        ELSE CHECK "Logo Flag" for which Preference Function is active
            INCREMENT the present Preference value
            SIGN MESSAGE - "Speed Up....." or
                    "More Repeats" or
                    "Awake Longer" or
                    "Asleep Longer" or "Movie Sound Higher" or
                    "Switch Click On"
    GO TO - /TRY ME LOGO Switch - SUBROUTINE - /KEY28
    GO SUB - /CLEARBODIES
    CHECK the "Logo Flag" for which Preference Function is active
        If it = 1
            SIGN MESSAGE - "SPEED CHANGE"
            Was LOGO Switch pressed again?
                IF Yes INCREMENT "Logo Flag" and GO TO new value
                ELSE await "<" or ">" to change Speed value.
        ELSE If it = 2
            SIGN MESSAGE - "REPEAT CHANGE"
            Was LOGO Switch pressed again?
                IF Yes INCREMENT "Logo Flag" and GO TO new value
                ELSE await "<" or ">" to change Repeat value.
        ELSE If it = 3
            SIGN MESSAGE - "AWAKE TIME CHANGE"
            Was LOGO Switch pressed again?
                IF Yes INCREMENT "Logo Flag" and GO TO new value
                ELSE await "<" or ">" to change Awake value.
        ELSE If it = 4
            SIGN MESSAGE - "ASLEEP TIME CHANGE"
            Was LOGO Switch pressed again?

IF Yes INCREMENT "Logo Flag" and GO TO new value
                    ELSE await "<" or ">" to change Asleep value.
        ELSE If it = 5
            SIGN MESSAGE - "MOVIE SOUND CHANGE"
            Was LOGO Switch pressed again?
                    IF Yes INCREMENT "Logo Flag" and GO TO new value
                    ELSE await "<" or ">" to change Movie Beep value.
        ELSE If it = 6
            SIGN MESSAGE - "SWITCH CLICK CHANGE"
            Was LOGO Switch pressed again?
                    IF Yes INCREMENT "Logo Flag" and GO TO new value
                    ELSE await "<" or ">" to change Switch Click value.
        ELSE If it = 7
            SIGN MESSAGE - "SPECIAL PROGRAMMING"
            Was LOGO Switch pressed again?

IF Yes SET "LOGO FLAG" To "1" GO TO "LOGO" Switch
        ELSE await "<" or ">" to change Switch Click value.
        IF 3 minutes expire without switch activation then
            GO TO - /TRY ME
        ELSE Jump to Subroutine accessed by Switch activation /CLEAR Switch - SUBROUTINE - /KEY29
    GO SUB - /CLEARBODIES
    CHECK to see if LOGO is ON or OFF
        If "Logo Flag" is presently OFF then
            CHECK to see if BEEP is ON or OFF
                If it is presently OFF then
                    SET "Beep Flag" to ON
                        SIGN MESSAGE - "BEEP ON....."
                ELSE SET "Beep Flag" to OFF
                    SIGN MESSAGE - "BEEP OFF....."
        Else if "Logo Flag" is on then Drop back to "Movie Mode"
    GO TO - /TRY ME /SPINAL Switch - SUBROUTINE - /KEY30
    GO SUB - /CLEARBODIES
    CHECK to see if SPINAL is ON or OFF
        If it is presently OFF then
            SET "Spinal Flag" to ON
                SIGN MESSAGE - "SPINAL NERVES ON....."
        ELSE SET "Spinal Flag" to OFF
            SIGN MESSAGE - "SPINAL NERVES OFF....."
    GO TO - /TRY ME /ANS Switch - SUBROUTINE - /KEY31
    GO SUB - /CLEARBODIES

```
            CHECK to see if ANS is ON or OFF
                If it is presently OFF then
                    SET "ANS Flag" to ON
                        SIGN MESSAGE - "ORGANS ON....."
                ELSE SET "ANS Flag" to OFF
                        SIGN MESSAGE - "ORGANS OFF....."
            GO TO - /TRY ME
```

'******************* The following 25 Keys reflect the Spinal Vertebra

```
C1  Switch - SUBROUTINE - /KEY8
        GO SUB - /CLEARBODIES
        SIGN MESSAGE - " VERTEBRA ...C1...."
        INITIALIZE - LOOP COUNTERS
        CHECK to see if the "Spinal Nerves" should be played
            If YES
            SUBROUTINE - /C1 SPINAL
            INITIALIZE LOOP COUNTER #1
            INITIALIZE SPEED and PAUSE
            INITIALIZE "MOVIE SOUND"
            SIGN MESSAGE - "..HEADACHES..."
            SIGN MESSAGE - "CAN BE AFFECTED BY THE SPINE"
            SIGN MESSAGE - "AT ...C1..."
            SUBROUTINE - PLAY C1 SPINAL LOOP
                    (/HEAD & /PHRENIC) MOVIE
                Turn Spinal Nerve lights on and off
                    REPEAT SPINAL LOOP according to LOOP COUNTER #1
        CHECK to see if the "ANS / Organs" should be played
            If YES
            SUBROUTINE - /C1 ANS
            INITIALIZE LOOP COUNTER #2
            INITIALIZE SPEED and PAUSE
            INITIALIZE "MOVIE SOUND"
            SUBROUTINE - PLAY C1 ANS LOOP
                    (/BRAIN) MOVIE
                Turn Organ lights on and off
                    REPEAT ANS LOOP according to LOOP COUNTER #2
        GO TO - /TRY ME C2  Switch - SUBROUTINE - /KEY7
        GO SUB - /CLEARBODIES
        SIGN MESSAGE - " VERTEBRA ...C2...."
```

INITIALIZE - LOOP COUNTERS
CHECK to see if the "Spinal Nerves" should be played
    If YES
    SUBROUTINE - /C2 SPINAL
    INITIALIZE LOOP COUNTER #1
INITIALIZE SPEED and PAUSE
INITIALIZE "MOVIE SOUND"
SIGN MESSAGE - "..HEADACHES..."
SIGN MESSAGE - "CAN BE AFFECTED BY THE SPINE"
SIGN MESSAGE - "AT ...C2..."
SUBROUTINE - PLAY C2 SPINAL LOOP
    (/HEAD & /PHRENIC) MOVIE
    Turn Spinal Nerve lights on and off
    REPEAT SPINAL LOOP according to LOOP COUNTER #1
CHECK to see if the "ANS / Organs" should be played
    If YES
    SUBROUTINE - /C2 ANS
    INITIALIZE LOOP COUNTER #2
INITIALIZE SPEED and PAUSE
INITIALIZE "MOVIE SOUND"
SIGN MESSAGE - "..EYES AND EARS..."
SIGN MESSAGE - "CAN BE AFFECTED BY THE SPINE"
SIGN MESSAGE - "AT ...C2..."
SUBROUTINE - PLAY C2 ANS LOOP
    (/BRAIN & /EYE) MOVIE
    Turn Organ lights on and off
    REPEAT ANS LOOP according to LOOP COUNTER #2
GO TO - /TRY ME C3 Switch - SUBROUTINE - /KEY6
    GO SUB - /CLEARBODIES
    SIGN MESSAGE - " VERTEBRA ...C3...."
    INITIALIZE - LOOP COUNTERS
    CHECK to see if the "Spinal Nerves" should be played
        If YES
        SUBROUTINE - /C3 SPINAL
        INITIALIZE LOOP COUNTER #1
    INITIALIZE SPEED and PAUSE
    INITIALIZE "MOVIE SOUND"
    SIGN MESSAGE - "..HEADACHES AND NECK STIFFNESS..."
    SIGN MESSAGE - "CAN BE AFFECTED BY THE SPINE"
    SIGN MESSAGE - "AT ...C3..."
    SUBROUTINE - PLAY C3 SPINAL LOOP
        (/HEAD & /PHRENIC & /UPPERCERV) MOVIE Turn Spinal Nerve lights on and off
        REPEAT SPINAL LOOP according to LOOP COUNTER #1

CHECK to see if the "ANS / Organs" should be played
        If YES
        SUBROUTINE - /C3 ANS
        INITIALIZE LOOP COUNTER #2
        INITIALIZE SPEED and PAUSE
        INITIALIZE "MOVIE SOUND"
        SIGN MESSAGE - "..THE SINUSES..."
        SIGN MESSAGE - "CAN BE AFFECTED BY THE SPINE"
        SIGN MESSAGE - "AT ...C3..."
        SUBROUTINE - PLAY C3 ANS LOOP
            (/BRAIN & /NOSE) MOVIE
            Turn Organ lights on and off
            REPEAT ANS LOOP according to LOOP COUNTER #2
    GO TO - /TRY ME C4 Switch - SUBROUTINE - /KEY5
    GO SUB - /CLEARBODIES
    SIGN MESSAGE - " VERTEBRA ...C4...."
    INITIALIZE - LOOP COUNTERS
    CHECK to see if the "Spinal Nerves" should be played
        If YES
        SUBROUTINE - /C4 SPINAL
        INITIALIZE LOOP COUNTER #1
        INITIALIZE SPEED and PAUSE
        INITIALIZE "MOVIE SOUND"
        SIGN MESSAGE - "..HEADACHES AND NECK PAIN..."
        SIGN MESSAGE - "CAN BE AFFECTED BY THE SPINE"
        SIGN MESSAGE - "AT ...C4..."
        SUBROUTINE - PLAY C4 SPINAL LOOP
            (/HEAD & /PHRENIC & /UPPERCERV) MOVIE
            Turn Spinal Nerve lights on and off
            REPEAT SPINAL LOOP according to LOOP COUNTER #1
    CHECK to see if the "ANS / Organs" should be played
        If YES
        SUBROUTINE - /C4 ANS
        INITIALIZE LOOP COUNTER #2
        INITIALIZE SPEED and PAUSE
        INITIALIZE "MOVIE SOUND"
        SIGN MESSAGE - "..SINUSES AND THE GLANDS IN THE MOUTH..."
        SIGN MESSAGE - "CAN BE AFFECTED BY THE SPINE"
        SIGN MESSAGE - "AT ...C4..."
        SUBROUTINE - PLAY C4 ANS LOOP
            (/NOSE & /MOUTH) MOVIE
            Turn Organ lights on and off
            REPEAT ANS LOOP according to LOOP COUNTER #2
    GO TO - /TRY ME C5 Switch - SUBROUTINE - /KEY4
    GO SUB - /CLEARBODIES
    SIGN MESSAGE - " VERTEBRA ...C5...."
    INITIALIZE - LOOP COUNTERS
    CHECK to see if the "Spinal Nerves" should be played
        If YES
        SUBROUTINE - /C5 SPINAL
        INITIALIZE LOOP COUNTER #1
        INITIALIZE SPEED and PAUSE
        INITIALIZE "MOVIE SOUND"
        SIGN MESSAGE - "..THE ARMS..."
        SIGN MESSAGE - "CAN BE AFFECTED BY THE SPINE"
        SIGN MESSAGE - "AT ...C5..."
        SUBROUTINE - PLAY C5 SPINAL LOOP
            (/UPPERCERV & /BRACHIAL)MOVIE
        Turn Spinal Nerve lights on and off
        REPEAT SPINAL LOOP according to LOOP COUNTER #1
    CHECK to see if the "ANS / Organs" should be played
        If YES
        SUBROUTINE - /C5 ANS
        INITIALIZE LOOP COUNTER #2
        INITIALIZE SPEED and PAUSE
        INITIALIZE "MOVIE SOUND"
        SIGN MESSAGE - "..THE GLANDS IN THE MOUTH AND THROAT..."
        SIGN MESSAGE - "CAN BE AFFECTED BY THE SPINE"
        SIGN MESSAGE - "AT ...C5..."
        SUBROUTINE - PLAY C5 ANS LOOP
            (/MOUTH & /THYROID)MOVIE
        Turn Organ lights on and off REPEAT ANS LOOP according to LOOP COUNTER #2
    GO TO - /TRY ME C6 Switch - SUBROUTINE - /KEY3
    GO SUB - /CLEARBODIES
    SIGN MESSAGE - " VERTEBRA ...C6...."
    INITIALIZE - LOOP COUNTERS CHECK to see if the "Spinal Nerves" should be played
        If YES
        SUBROUTINE - /C6 SPINAL
        INITIALIZE LOOP COUNTER #1
        INITIALIZE SPEED and PAUSE
        INITIALIZE "MOVIE SOUND"
        SIGN MESSAGE - ".. THE ARMS..."

SIGN MESSAGE - "CAN BE AFFECTED BY THE SPINE"
SIGN MESSAGE - "AT ...C6..."
SUBROUTINE - PLAY C6 SPINAL LOOP
    (/BRACHIAL) MOVIE
    Turn Spinal Nerve lights on and off
    REPEAT SPINAL LOOP according to LOOP COUNTER #1
CHECK to see if the "ANS / Organs" should be played
    If YES
    SUBROUTINE - /C6 ANS
    INITIALIZE LOOP COUNTER #2
    INITIALIZE SPEED and PAUSE
    INITIALIZE "MOVIE SOUND"
    SIGN MESSAGE - "..THE THYROID..."
    SIGN MESSAGE - "CAN BE AFFECTED BY THE SPINE"
    SIGN MESSAGE - "AT ...C6..."
    SUBROUTINE - PLAY C6 ANS LOOP
        (/THYROID) MOVIE
        Turn Organ lights on and off
        REPEAT ANS LOOP according to LOOP COUNTER #2
GO TO - /TRY ME C7 Switch - SUBROUTINE - /KEY2
    GO SUB - /CLEARBODIES
    SIGN MESSAGE - " VERTEBRA ...C7...."

INITIALIZE - LOOP COUNTERS
    CHECK to see if the "Spinal Nerves" should be played
        If YES
        SUBROUTINE - /C7 SPINAL
        INITIALIZE LOOP COUNTER #1
        INITIALIZE SPEED and PAUSE
        INITIALIZE "MOVIE SOUND"
        SIGN MESSAGE - "..THE ARMS..."
        SIGN MESSAGE - "CAN BE AFFECTED BY THE SPINE"
        SIGN MESSAGE - "AT ...C7..."
        SUBROUTINE - PLAY C7 SPINAL LOOP
            (/BRACHIAL) MOVIE
            Turn Spinal Nerve lights on and off
            REPEAT SPINAL LOOP according to LOOP COUNTER #1

CHECK to see if the "ANS / Organs" should be played
        If YES
        SUBROUTINE - /C7 ANS
        INITIALIZE LOOP COUNTER #2
        INITIALIZE SPEED and PAUSE
        INITIALIZE "MOVIE SOUND"

SIGN MESSAGE - "..THE HEART AND RESPIRATORY TRACT..."
SIGN MESSAGE - "CAN BE AFFECTED BY THE SPINE"
SIGN MESSAGE - "AT ...C7..."
SUBROUTINE - PLAY C7 ANS LOOP
    (/HEART & /LUNG) MOVIE
    Turn Organ lights on and off
    REPEAT ANS LOOP according to LOOP COUNTER #2
GO TO - /TRY ME

T1 Switch - SUBROUTINE - /KEY1
    GO SUB - /CLEARBODIES
    SIGN MESSAGE - " VERTEBRA ...T1...."
    INITIALIZE - LOOP COUNTERS
    CHECK to see if the "Spinal Nerves" should be played
        If YES
        SUBROUTINE - /T1 SPINAL
        INITIALIZE LOOP COUNTER #1
        INITIALIZE SPEED and PAUSE
        INITIALIZE "MOVIE SOUND"

SIGN MESSAGE - "..THE ARMS..."
    SIGN MESSAGE - "CAN BE AFFECTED BY THE SPINE"
    SIGN MESSAGE - "AT ...T1..."
    SUBROUTINE - PLAY T1 SPINAL LOOP
        (/BRACHIAL) MOVIE
        Turn Spinal Nerve lights on and off
        REPEAT SPINAL LOOP according to LOOP COUNTER #1
CHECK to see if the "ANS / Organs" should be played
    If YES
    SUBROUTINE - /T1 ANS
    INITIALIZE LOOP COUNTER #2
    INITIALIZE SPEED and PAUSE
    INITIALIZE "MOVIE SOUND"
    SIGN MESSAGE - "..THE HEART AND RESPIRATORY TRACT..."
    SIGN MESSAGE - "CAN BE AFFECTED BY THE SPINE"
    SIGN MESSAGE - "AT ...T1..."
    SUBROUTINE - PLAY T1 ANS LOOP
        (/HEART & /LUNG) MOVIE
        Turn Organ lights on and off
        REPEAT ANS LOOP according to LOOP COUNTER #2
GO TO - /TRY ME

T2 Switch - SUBROUTINE - /KEY16
    GO SUB - /CLEARBODIES
    SIGN MESSAGE - " VERTEBRA ...T2...."
    INITIALIZE - LOOP COUNTERS CHECK to see if the "Spinal Nerves" should be played
    If YES
    SUBROUTINE - /T2 SPINAL
    INITIALIZE LOOP COUNTER #1
    INITIALIZE SPEED and PAUSE
    INITIALIZE "MOVIE SOUND"
    SIGN MESSAGE - "..THE CHEST AND SHOULDER..."
    SIGN MESSAGE - "CAN BE AFFECTED BY THE SPINE"
    SIGN MESSAGE - "AT ...T2..."
    SUBROUTINE - PLAY T2 SPINAL LOOP
        (/UPPERINTER) MOVIE
        Turn Spinal Nerve lights on and off
        REPEAT SPINAL LOOP according to LOOP COUNTER #1
CHECK to see if the "ANS / Organs" should be played If YES
    SUBROUTINE - /T2 ANS
    INITIALIZE LOOP COUNTER #2
    INITIALIZE SPEED and PAUSE
    INITIALIZE "MOVIE SOUND"
    SIGN MESSAGE - "..RESPIRATION..."
    SIGN MESSAGE - "CAN BE AFFECTED BY THE SPINE"
    SIGN MESSAGE - "AT ...T2..."
    SUBROUTINE - PLAY T2 ANS LOOP
        (/LUNG) MOVIE
        Turn Organ lights on and off
        REPEAT ANS LOOP according to LOOP COUNTER #2
GO TO - /TRY ME T3 Switch - SUBROUTINE - /KEY15
    GO SUB - /CLEARBODIES
    SIGN MESSAGE - " VERTEBRA ...T3...."
    INITIALIZE - LOOP COUNTERS
    CHECK to see if the "Spinal Nerves" should be played
        If YES
        SUBROUTINE - /T3 SPINAL
        INITIALIZE LOOP COUNTER #1
        INITIALIZE SPEED and PAUSE
        INITIALIZE "MOVIE SOUND"
        SIGN MESSAGE - "..THE CHEST AND SHOULDER..."
        SIGN MESSAGE - "CAN BE AFFECTED BY THE SPINE"
        SIGN MESSAGE - "AT ...T3..."

SUBROUTINE - PLAY T3 SPINAL LOOP
            (/UPPERINTER) MOVIE
            Turn Spinal Nerve lights on and off
            REPEAT SPINAL LOOP according to LOOP COUNTER #1

CHECK to see if the "ANS / Organs" should be played
    If YES
    SUBROUTINE - /T3 ANS
    INITIALIZE LOOP COUNTER #2
    INITIALIZE SPEED and PAUSE
    INITIALIZE "MOVIE SOUND"
    SIGN MESSAGE - "..RESPIRATION..."
    SIGN MESSAGE - "CAN BE AFFECTED BY THE SPINE"

SIGN MESSAGE - "AT ...T3..."
    SUBROUTINE - PLAY T3 ANS LOOP
        (/LUNG) MOVIE
        Turn Organ lights on and off
        REPEAT ANS LOOP according to LOOP COUNTER #2
GO TO - /TRY ME T4 Switch - SUBROUTINE - /KEY14
    GO SUB - /CLEARBODIES
    SIGN MESSAGE - " VERTEBRA ...T4...."
    INITIALIZE - LOOP COUNTERS
    CHECK to see if the "Spinal Nerves" should be played
        If YES
        SUBROUTINE - /T4 SPINAL
        INITIALIZE LOOP COUNTER #1
        INITIALIZE SPEED and PAUSE
        INITIALIZE "MOVIE SOUND"
        SIGN MESSAGE - "..THE CHEST AND BACK..."
        SIGN MESSAGE - "CAN BE AFFECTED BY THE SPINE"
        SIGN MESSAGE - "AT ...T4..."
        SUBROUTINE - PLAY T4 SPINAL LOOP
            (/UPPERINTER) MOVIE
            Turn Spinal Nerve lights on and off
            REPEAT SPINAL LOOP according to LOOP COUNTER #1
    CHECK to see if the "ANS / Organs" should be played
        If YES SUBROUTINE - /T4 ANS
        INITIALIZE LOOP COUNTER #2
        INITIALIZE SPEED and PAUSE
        INITIALIZE "MOVIE SOUND"
        SIGN MESSAGE - "..THE GALL BLADDER..."
        SIGN MESSAGE - "CAN BE AFFECTED BY THE SPINE"
        SIGN MESSAGE - "AT ...T4..."
        SUBROUTINE - PLAY T4 ANS LOOP
            (/GALLBLADDER) MOVIE
            Turn Organ lights on and off
            REPEAT ANS LOOP according to LOOP COUNTER #2
GO TO - /TRY ME T5 Switch - SUBROUTINE - /KEY13
    GO SUB - /CLEARBODIES
    SIGN MESSAGE - " VERTEBRA ...T5...."
    INITIALIZE - LOOP COUNTERS
    CHECK to see if the "Spinal Nerves" should be played
        If YES
        SUBROUTINE - /T5 SPINAL
        INITIALIZE LOOP COUNTER #1
        INITIALIZE SPEED and PAUSE
        INITIALIZE "MOVIE SOUND"
        SIGN MESSAGE - "..THE MIDBACK..."
        SIGN MESSAGE - "CAN BE AFFECTED BY THE SPINE"
        SIGN MESSAGE - "AT ...T5..."
        SUBROUTINE - PLAY T5 SPINAL LOOP
            (/UPPERINTER) MOVIE
           Turn Spinal Nerve lights on and off
           REPEAT SPINAL LOOP according to LOOP COUNTER #1
    CHECK to see if the "ANS / Organs" should be played
        If YES
        SUBROUTINE - /T5 ANS
        INITIALIZE LOOP COUNTER #2
        INITIALIZE SPEED and PAUSE
        INITIALIZE "MOVIE SOUND"
        SIGN MESSAGE - "..THE STOMACH..."
        SIGN MESSAGE - "CAN BE AFFECTED BY THE SPINE"
        SIGN MESSAGE - "AT ...T5..."
        SUBROUTINE - PLAY T5 ANS LOOP
            (/STOMACH) MOVIE
           Turn Organ lights on and off
           REPEAT ANS LOOP according to LOOP COUNTER #2
    GO TO - /TRY ME T6 Switch - SUBROUTINE - /KEY12
    GO SUB - /CLEARBODIES
    SIGN MESSAGE - " VERTEBRA ...T6...."
    INITIALIZE - LOOP COUNTERS
    CHECK to see if the "Spinal Nerves" should be played
        If YES SUBROUTINE - /T6 SPINAL
        INITIALIZE LOOP COUNTER #1
        INITIALIZE SPEED and PAUSE
        INITIALIZE "MOVIE SOUND"
        SIGN MESSAGE - "..THE MIDBACK..."
        SIGN MESSAGE - "CAN BE AFFECTED BY THE SPINE"
        SIGN MESSAGE - "AT ...T6..."

SUBROUTINE - PLAY T6 SPINAL LOOP
    (/MIDDLEINTER) MOVIE
    Turn Spinal Nerve lights on and off
    REPEAT SPINAL LOOP according to LOOP COUNTER #1
CHECK to see if the "ANS / Organs" should be played
    If YES
    SUBROUTINE - /T6 ANS
    INITIALIZE LOOP COUNTER #2
    INITIALIZE SPEED and PAUSE
    INITIALIZE "MOVIE SOUND"
    SIGN MESSAGE - "..THE PANCREAS..."
    SIGN MESSAGE - "CAN BE AFFECTED BY THE SPINE"
    SIGN MESSAGE - "AT ...T6..."
    SUBROUTINE - PLAY T6 ANS LOOP
        (/PANCREAS) MOVIE
        Turn Organ lights on and off
        REPEAT ANS LOOP according to LOOP COUNTER #2
GO TO - /TRY ME T7 Switch - SUBROUTINE - /KEY11
    GO SUB - /CLEARBODIES
    SIGN MESSAGE - " VERTEBRA ...T7...."
    INITIALIZE - LOOP COUNTERS
    CHECK to see if the "Spinal Nerves" should be played
        If YES
        SUBROUTINE - /T7 SPINAL
        INITIALIZE LOOP COUNTER #1
        INITIALIZE SPEED and PAUSE
        INITIALIZE "MOVIE SOUND"
        SIGN MESSAGE - "..THE MIDBACK..."
        SIGN MESSAGE - "CAN BE AFFECTED BY THE SPINE"
        SIGN MESSAGE - "AT ...T7..."

SUBROUTINE - PLAY T7 SPINAL LOOP
            (/MIDDLEINTER) MOVIE
            Turn Spinal Nerve lights on and off
            REPEAT SPINAL LOOP according to LOOP COUNTER #1
    CHECK to see if the "ANS / Organs" should be played
        If YES
        SUBROUTINE - /T7 ANS
        INITIALIZE LOOP COUNTER #2
        INITIALIZE SPEED and PAUSE
        INITIALIZE "MOVIE SOUND"
        SIGN MESSAGE - "..THE SPLEEN..."
        SIGN MESSAGE - "CAN BE AFFECTED BY THE SPINE"
        SIGN MESSAGE - "AT ...T7..."
        SUBROUTINE - PLAY T7 ANS LOOP
            (/SPLEEN) MOVIE Turn Organ lights on and off
REPEAT ANS LOOP according to LOOP COUNTER #2
GO TO - /TRY ME T8 Switch - SUBROUTINE - /KEY10
GO SUB - /CLEARBODIES
SIGN MESSAGE - " VERTEBRA ...T8...."
INITIALIZE - LOOP COUNTERS
CHECK to see if the "Spinal Nerves" should be played
    If YES
    SUBROUTINE - /T8 SPINAL
    INITIALIZE LOOP COUNTER #1
    INITIALIZE SPEED and PAUSE
    INITIALIZE "MOVIE SOUND"
    SIGN MESSAGE - "..THE LOWER BACK..."
    SIGN MESSAGE - "CAN BE AFFECTED BY THE SPINE"
    SIGN MESSAGE - "AT ...T8..."
    SUBROUTINE - PLAY T8 SPINAL LOOP
        (/MIDDLEINTER) MOVIE
    Turn Spinal Nerve lights on and off
    REPEAT SPINAL LOOP according to LOOP COUNTER #1
CHECK to see if the "ANS / Organs" should be played
    If YES
    SUBROUTINE - /T8 ANS INITIALIZE LOOP COUNTER #2
    INITIALIZE SPEED and PAUSE
    INITIALIZE "MOVIE SOUND"
    SIGN MESSAGE - "..THE LIVER AND BLOOD VESSELS OF THE
        ABDOMEN..."
    SIGN MESSAGE - "CAN BE AFFECTED BY THE SPINE"
    SIGN MESSAGE - "AT ...T8..."
    SUBROUTINE - PLAY T8 ANS LOOP
        (/LIVER & BLOODVESSEL) MOVIE
    Turn Organ lights on and off
    REPEAT ANS LOOP according to LOOP COUNTER #2
GO TO - /TRY ME T9 Switch - SUBROUTINE - /KEY9
GO SUB - /CLEARBODIES
SIGN MESSAGE - " VERTEBRA ...T9...."
INITIALIZE - LOOP COUNTERS
CHECK to see if the "Spinal Nerves" should be played
    If YES
    SUBROUTINE - /T9 SPINAL
    INITIALIZE LOOP COUNTER #1
    INITIALIZE SPEED and PAUSE INITIALIZE "MOVIE SOUND"
SIGN MESSAGE - "..THE LOWER BACK..."
SIGN MESSAGE - "CAN BE AFFECTED BY THE SPINE"
SIGN MESSAGE - "AT ...T9..."
SUBROUTINE - PLAY T9 SPINAL LOOP
    (/MIDDLEINTER) MOVIE
    Turn Spinal Nerve lights on and off
    REPEAT SPINAL LOOP according to LOOP COUNTER #1
CHECK to see if the "ANS / Organs" should be played
    If YES
    SUBROUTINE - /T9 ANS
    INITIALIZE LOOP COUNTER #2
    INITIALIZE SPEED and PAUSE
    INITIALIZE "MOVIE SOUND"
    SIGN MESSAGE - "..THE ADRENAL GLAND..."
    SIGN MESSAGE - "CAN BE AFFECTED BY THE SPINE"
    SIGN MESSAGE - "AT ...T9..."
    SUBROUTINE - PLAY T9 ANS LOOP
        (/ADRENAL) MOVIE
        Turn Organ lights on and off
        REPEAT ANS LOOP according to LOOP COUNTER #2
GO TO - /TRY ME T10 Switch - SUBROUTINE - /KEY24
    GO SUB - /CLEARBODIES
    SIGN MESSAGE - " VERTEBRA ...T10...."
    INITIALIZE - LOOP COUNTERS
    CHECK to see if the "Spinal Nerves" should be played
        If YES
        SUBROUTINE - /T10 SPINAL
        INITIALIZE LOOP COUNTER #1
        INITIALIZE SPEED and PAUSE
        INITIALIZE "MOVIE SOUND"
        SIGN MESSAGE - "..THE LOW BACK..."
        SIGN MESSAGE - "CAN BE AFFECTED BY THE SPINE"
        SIGN MESSAGE - "AT ...T10..."
        SUBROUTINE - PLAY T10 SPINAL LOOP
            (/LOWERINTER) MOVIE
            Turn Spinal Nerve lights on and off
            REPEAT SPINAL LOOP according to LOOP COUNTER #1
    CHECK to see if the "ANS / Organs" should be played
        If YES
        SUBROUTINE - /T10 ANS
        INITIALIZE LOOP COUNTER #2
        INITIALIZE SPEED and PAUSE
        INITIALIZE "MOVIE SOUND"

```
                SIGN MESSAGE - "..THE SMALL INTESTINE..."
                SIGN MESSAGE - "CAN BE AFFECTED BY THE SPINE"
                SIGN MESSAGE - "AT ...T10..."
                SUBROUTINE - PLAY T10 ANS LOOP
                        (/SMALLINT) MOVIE
                    Turn Organ lights on and off
                        REPEAT ANS LOOP according to LOOP COUNTER #2
        GO TO - /TRY ME T11 Switch - SUBROUTINE - /KEY23
        GO SUB - /CLEARBODIES
        SIGN MESSAGE - " VERTEBRA ...T11...."
        INITIALIZE - LOOP COUNTERS
        CHECK to see if the "Spinal Nerves" should be played
                If YES
                SUBROUTINE - /T11 SPINAL
                INITIALIZE LOOP COUNTER #1
                INITIALIZE SPEED and PAUSE
                INITIALIZE "MOVIE SOUND"
                SIGN MESSAGE - "..THE LOW BACK AND HIPS..."
                SIGN MESSAGE - "CAN BE AFFECTED BY THE SPINE"
                SIGN MESSAGE - "AT ...T11..."
                SUBROUTINE - PLAY T11 SPINAL LOOP
                        (/LOWERINTER) MOVIE
                    Turn Spinal Nerve lights on and off
                        REPEAT SPINAL LOOP according to LOOP COUNTER #1

CHECK to see if the "ANS / Organs" should be played
                If YES
                SUBROUTINE - /T11 ANS
                INITIALIZE LOOP COUNTER #2
                INITIALIZE SPEED and PAUSE
                INITIALIZE "MOVIE SOUND"
                SIGN MESSAGE - "..THE KIDNEYS..."
                SIGN MESSAGE - "CAN BE AFFECTED BY THE SPINE"
                SIGN MESSAGE - "AT ...T11..."
                SUBROUTINE - PLAY T11 ANS LOOP
                        (/KIDNEY) MOVIE
                    Turn Organ lights on and off
                        REPEAT ANS LOOP according to LOOP COUNTER #2
        GO TO - /TRY ME T12 Switch - SUBROUTINE - /KEY22
        GO SUB - /CLEARBODIES
        SIGN MESSAGE - " VERTEBRA ...T12...."
        INITIALIZE - LOOP COUNTERS
```

CHECK to see if the "Spinal Nerves" should be played
    If YES
    SUBROUTINE - /T12 SPINAL
    INITIALIZE LOOP COUNTER #1
    INITIALIZE SPEED and PAUSE
    INITIALIZE "MOVIE SOUND"
    SIGN MESSAGE - "..THE LOW BACK AND HIPS..."
    SIGN MESSAGE - "CAN BE AFFECTED BY THE SPINE"
    SIGN MESSAGE - "AT ...T12..."
    SUBROUTINE - PLAY T12 SPINAL LOOP
        (/LOWERINTER & /UPPERLUMBAR) MOVIE
        Turn Spinal Nerve lights on and off
        REPEAT SPINAL LOOP according to LOOP COUNTER #1
CHECK to see if the "ANS / Organs" should be played
    If YES
    SUBROUTINE - /T12 ANS
    INITIALIZE LOOP COUNTER #2
    INITIALIZE SPEED and PAUSE
    INITIALIZE "MOVIE SOUND"
    SIGN MESSAGE - "..THE KIDNEYS..."
    SIGN MESSAGE - "CAN BE AFFECTED BY THE SPINE"
    SIGN MESSAGE - "AT ...T12..."
    SUBROUTINE - PLAY T12 ANS LOOP
        (/KIDNEY) MOVIE
        Turn Organ lights on and off
        REPEAT ANS LOOP according to LOOP COUNTER #2
GO TO - /TRY ME L1 Switch - SUBROUTINE - /KEY21
    GO SUB - /CLEARBODIES
    SIGN MESSAGE - " VERTEBRA ...L1...."
    INITIALIZE - LOOP COUNTERS
    CHECK to see if the "Spinal Nerves" should be played
        If YES
        SUBROUTINE - /L1 SPINAL
        INITIALIZE LOOP COUNTER #1
        INITIALIZE SPEED and PAUSE
        INITIALIZE "MOVIE SOUND"
        SIGN MESSAGE - "..THE HIPS AND LOW BACK..."
        SIGN MESSAGE - "CAN BE AFFECTED BY THE SPINE"
        SIGN MESSAGE - "AT ...L1..."
        SUBROUTINE - PLAY L1 SPINAL LOOP (/FEMORAL & /UPPERLUMBAR) MOVIE
        Turn Spinal Nerve lights on and off
        REPEAT SPINAL LOOP according to LOOP COUNTER #1

CHECK to see if the "ANS / Organs" should be played
    If YES
    SUBROUTINE - /L1 ANS
    INITIALIZE LOOP COUNTER #2
    INITIALIZE SPEED and PAUSE
    INITIALIZE "MOVIE SOUND"
    SIGN MESSAGE - "..THE LARGE INTESTINE AND BOWEL..."
    SIGN MESSAGE - "CAN BE AFFECTED BY THE SPINE"
    SIGN MESSAGE - "AT ...L1..."
    SUBROUTINE - PLAY L1 ANS LOOP
        (/LARGEINT & /VALVE) MOVIE
        Turn Organ lights on and off
        REPEAT ANS LOOP according to LOOP COUNTER #2
GO TO - /TRY ME L2 Switch - SUBROUTINE - /KEY20
    GO SUB - /CLEARBODIES
    SIGN MESSAGE - " VERTEBRA ...L2...."
    INITIALIZE - LOOP COUNTERS CHECK to see if the "Spinal Nerves" should be played
        If YES
        SUBROUTINE - /L2 SPINAL
        INITIALIZE LOOP COUNTER #1
        INITIALIZE SPEED and PAUSE
        INITIALIZE "MOVIE SOUND"
        SIGN MESSAGE - "..THE HIPS AND FRONT THIGHS..."
        SIGN MESSAGE - "CAN BE AFFECTED BY THE SPINE"
        SIGN MESSAGE - "AT ...L2..."
        SUBROUTINE - PLAY L2 SPINAL LOOP
            (/FEMORAL & /UPPERLUMBAR) MOVIE
            Turn Spinal Nerve lights on and off
            REPEAT SPINAL LOOP according to LOOP COUNTER #1
    CHECK to see if the "ANS / Organs" should be played
        If YES
        SUBROUTINE - /L2 ANS
        INITIALIZE LOOP COUNTER #2
        INITIALIZE SPEED and PAUSE
        INITIALIZE "MOVIE SOUND"
        SIGN MESSAGE - "..THE LARGE INTESTINE AND BOWEL..."
        SIGN MESSAGE - "CAN BE AFFECTED BY THE SPINE"
        SIGN MESSAGE - "AT ...L2..."
        SUBROUTINE - PLAY L2 ANS LOOP
            (/LARGEINT & /VALVE) MOVIE
            Turn Organ lights on and off
            REPEAT ANS LOOP according to LOOP COUNTER #2
GO TO - /TRY ME L3 Switch - SUBROUTINE - /KEY19
    GO SUB - /CLEARBODIES
    SIGN MESSAGE - " VERTEBRA ...L3...."
    INITIALIZE - LOOP COUNTERS
    CHECK to see if the "Spinal Nerves" should be played
        If YES
        SUBROUTINE - /L3 SPINAL
        INITIALIZE LOOP COUNTER #1
        INITIALIZE SPEED and PAUSE
        INITIALIZE "MOVIE SOUND"
        SIGN MESSAGE - "..THE HIPS AND FRONT THIGHS..."
        SIGN MESSAGE - "CAN BE AFFECTED BY THE SPINE"
        SIGN MESSAGE - "AT ...L3..."
        SUBROUTINE - PLAY L3 SPINAL LOOP (/FEMORAL) MOVIE
            Turn Spinal Nerve lights on and off
            REPEAT SPINAL LOOP according to LOOP COUNTER #1
    CHECK to see if the "ANS / Organs" should be played
        If YES
        SUBROUTINE - /L3 ANS
        INITIALIZE LOOP COUNTER #2
        INITIALIZE SPEED and PAUSE
        INITIALIZE "MOVIE SOUND"
        SIGN MESSAGE - "..THE BLADDER AND REPRODUCTIVE
                ORGANS..."
        SIGN MESSAGE - "CAN BE AFFECTED BY THE SPINE"
        SIGN MESSAGE - "AT ...L3..."
        SUBROUTINE - PLAY L3 ANS LOOP (/BLADDER & FEMALE & MALE) MOVIE
            Turn Organ lights on and off
            REPEAT ANS LOOP according to LOOP COUNTER #2
    GO TO - /TRY ME L4 Switch - SUBROUTINE - /KEY18
    GO SUB - /CLEARBODIES
    SIGN MESSAGE - " VERTEBRA ...L4...."
    INITIALIZE - LOOP COUNTERS
    CHECK to see if the "Spinal Nerves" should be played
        If YES
        SUBROUTINE - /L4 SPINAL
        INITIALIZE LOOP COUNTER #1
        INITIALIZE SPEED and PAUSE
        INITIALIZE "MOVIE SOUND"
        SIGN MESSAGE - "..THE LEGS..."
        SIGN MESSAGE - "CAN BE AFFECTED BY THE SPINE"

SIGN MESSAGE - "AT ...L4..."
SUBROUTINE - PLAY L4 SPINAL LOOP
    (/SCIATIC) MOVIE
  Turn Spinal Nerve lights on and off
  REPEAT SPINAL LOOP according to LOOP COUNTER #1
CHECK to see if the "ANS / Organs" should be played
  If YES
  SUBROUTINE - /L4 ANS
  INITIALIZE LOOP COUNTER #2
  INITIALIZE SPEED and PAUSE
  INITIALIZE "MOVIE SOUND"
  SIGN MESSAGE - "..THE REPRODUCTIVE ORGANS AND BOWELS..."
  SIGN MESSAGE - "CAN BE AFFECTED BY THE SPINE"
  SIGN MESSAGE - "AT ...L4..."
  SUBROUTINE - PLAY L4 ANS LOOP
    (/RECTUM & /FEMALE & /MALE) MOVIE
  Turn Organ lights on and off
  REPEAT ANS LOOP according to LOOP COUNTER #2
GO TO - /TRY ME

L5 Switch - SUBROUTINE - /KEY17

GO SUB - /CLEARBODIES
SIGN MESSAGE - " VERTEBRA ...L5...."
INITIALIZE - LOOP COUNTERS
CHECK to see if the "Spinal Nerves" should be played
  If YES
  SUBROUTINE - /L5 SPINAL
  INITIALIZE LOOP COUNTER #1
  INITIALIZE SPEED and PAUSE
  INITIALIZE "MOVIE SOUND"
  SIGN MESSAGE - "..THE LEGS..."
  SIGN MESSAGE - "CAN BE AFFECTED BY THE SPINE"
  SIGN MESSAGE - "AT ...L5..."
  SUBROUTINE - PLAY L5 SPINAL LOOP
    (/SCIATIC) MOVIE
  Turn Spinal Nerve lights on and off
  REPEAT SPINAL LOOP according to LOOP COUNTER #1
CHECK to see if the "ANS / Organs" should be played
  If YES
  SUBROUTINE - /L5 ANS
  INITIALIZE LOOP COUNTER #2
  INITIALIZE SPEED and PAUSE
  INITIALIZE "MOVIE SOUND"
  SIGN MESSAGE - "..THE REPRODUCTIVE ORGANS AND BOWELS..."
  SIGN MESSAGE - "CAN BE AFFECTED BY THE SPINE"

SIGN MESSAGE - "AT ...L5..."
SUBROUTINE - PLAY L5 ANS LOOP
    (/RECTUM & /MALE) MOVIE
    Turn Organ lights on and off
    REPEAT ANS LOOP according to LOOP COUNTER #2
GO TO - /TRY ME SACRUM Switch - SUBROUTINE - /KEY32
    GO SUB - /CLEARBODIES
    SIGN MESSAGE - " ...SACRUM...."
    INITIALIZE - LOOP COUNTERS
    CHECK to see if the "Spinal Nerves" should be played
        If YES
        SUBROUTINE - /SACRUM SPINAL
        INITIALIZE LOOP COUNTER #1

INITIALIZE SPEED and PAUSE
        INITIALIZE "MOVIE SOUND"
        SIGN MESSAGE - "..THE LEGS..."
        SIGN MESSAGE - "CAN BE AFFECTED BY THE SPINE"
        SIGN MESSAGE - "AT ...SACRUM..."
        SUBROUTINE - PLAY SACRUM SPINAL LOOP
            (/SCIATIC) MOVIE
            Turn Spinal Nerve lights on and off
            REPEAT SPINAL LOOP according to LOOP COUNTER #1
    CHECK to see if the "ANS / Organs" should be played
        If YES
        SUBROUTINE - /SACRUM ANS
        INITIALIZE LOOP COUNTER #2
        INITIALIZE SPEED and PAUSE
        INITIALIZE "MOVIE SOUND"
        SIGN MESSAGE - "..MOST LOWER ORGANS..."
        SIGN MESSAGE - "CAN BE AFFECTED BY THE SPINE"
        SIGN MESSAGE - "AT ...SACRUM..."
        SUBROUTINE - PLAY SACRUM ANS LOOP
            (/BLADDER & /LARGEINT & /VALVE & /FEMALE &
            /MALE & RECTUM) MOVIE
            Turn Organ lights on and off
            REPEAT ANS LOOP according to LOOP COUNTER #2
    GO TO - /TRY ME '****************** The following are Spinal Nerve Movies EACH OF THESE SUBROUTINES SEQUENTIALLY TURNS THEIR RESPECTIVE LIGHTS ON AND OFF.
/HEAD Movie - SUBROUTINE
/PHRENIC Movie - SUBROUTINE
/UPPERCERV Movie - SUBROUTINE
/BRACHIAL Movie - SUBROUTINE
/UPPERINTER Movie - SUBROUTINE
/MIDDLEINTER Movie - SUBROUTINE
/LOWERINTER Movie - SUBROUTINE
/FEMORAL Movie - SUBROUTINE
/UPPERLUMBAR Movie - SUBROUTINE
/SCIATIC Movie - SUBROUTINE '****************** The following are Autonomic Nerve Movies EACH OF THESE SUBROUTINES SEQUENTIALLY TURNS THEIR RESPECTIVE LIGHTS ON OFF.
/BRAIN Movie - SUBROUTINE
/EYE Movie - SUBROUTINE
/NOSE Movie - SUBROUTINE
/MOUTH Movie - SUBROUTINE
/THYROID Movie - SUBROUTINE
/LUNG Movie - SUBROUTINE
/HEART Movie - SUBROUTINE
/LIVER Movie - SUBROUTINE
/STOMACH Movie - SUBROUTINE
/GALLBLADDER Movie - SUBROUTINE
/BLOODVESSEL Movie - SUBROUTINE
/SPLEEN Movie - SUBROUTINE
/PANCREAS Movie - SUBROUTINE
/ADRENAL Movie - SUBROUTINE
/SMALLINT Movie - SUBROUTINE
/LARGEINT Movie - SUBROUTINE
/VALVE Movie - SUBROUTINE
/KIDNEY Movie - SUBROUTINE
/BLADDER Movie - SUBROUTINE
/FEMALE Movie - SUBROUTINE
/MALE Movie - SUBROUTINE
/RECTUM Movie - SUBROUTINE
DATA 0,END The above software translation can be incorporated by known techniques and as described above into the hardware of the display apparatus of the invention thereby to incorporate into the display apparatus of the invention all of the functions and routines and subroutines indicated hereinabove.

It is anticipated that many other anatomical systems will be immediately applied to this invention, i.e., Muscles, Dermatomes, Pain Zones, Joints, Circulatory Systems, etc. Another immediate contemplated use is the application of this invention to: maps (geographical or directories); charts of mechanical systems; and organizational systems.

There will now be obvious to those skilled in the art many modifications and variations of the apparatus and methods set forth hereinabove. These modifications and variations will not depart from the scope of the invention if defined by the following claims.

What is claimed is:

1. Display apparatus comprising display means for displaying at least part of a spine including a plurality of vertebrae and for displaying a plurality of organs physiologically associated with said vertebrae, said display means including a light penetrable support means on which said vertebrae and organs are displayed, a plurality of light generating means at least some of which are positioned for selectively illuminating respective of said vertebrae and organs, a plurality of control switch means supported on said support means, circuit means coupling said control switch means to said light generating means for the illumination of said vertebrae and organs, and electronic computer means coupled to said control switch means and to said circuit means and responsive at least in part to said control switch means for controlling the selection and automatic sequencing of illumination of the light generating means, said control switch means being operable independently of said electronic computer means for selectively operating said light generating means.

2. Display apparatus as claimed in claim 1 further comprising a display sign means on said support means, said computer means being coupled by said circuit means to said sign means and including means to display a visually perceptible message on the sign means.

3. Display apparatus as claimed in claim 2 wherein the computer means includes means for scrolling the message on the sign means.

4. Display apparatus as claimed in claim 3 wherein the computer means includes means for controlling the speed of the scrolling.

5. Display apparatus as claimed in claim 2 comprising control means coupled to the computer means, circuit means and switch means to enable the switch means to function to control the message which is displayed on the sign means.

6. Display apparatus as claimed in claim 2 wherein the computer means is provided with software information to enable the automatic sequencing of the illuminating of the light generating means and in which software information is embodied an indication of the proprietary origin of the software, said computer means including means to isolate and display the indication on the sign means.

7. Display apparatus as claimed in claim 2 wherein the computer means includes timing means to enable the display apparatus to function for predetermined periods of time.

8. Display apparatus as claimed in claim 1 wherein the computer means includes means to control the speed of sequencing of the illumination of the light generating means.

9. Display apparatus as claimed in claim 1 wherein the display means includes means for displaying a nerve system, and further light generating means for illuminating the nerve system and coupled to the circuit means for being controlled by said switch means and computer means.

10. Display apparatus as claimed in claim 2 wherein the computer means includes means to cause the sign means to display tutorial messages instructing a user to respond by operating selected of said switches.

11. Display apparatus as claimed in claim 2 wherein the computer means includes means to cause the sign means to display tutorial messages explaining the sequencing of illumination of the light generating means.

12. Display apparatus as claimed in claim 2 comprising sound generating means coupled to said computer means and responsive thereto for generating sound associated with said message.

13. Display apparatus as claimed in claim 1 wherein said display means includes a flexible light permeable sheet, a plurality of information bearing ink layers on said sheet to display therethrough said spine and organs, a further sheet spaced from said flexible sheet, said switch means including cooperating pairs of switch elements on respective of said sheets and adapted for being inter-engaged by manipulation of said flexible sheet.

14. Display apparatus as claimed in claim 13 wherein said display means includes a printed circuit board on which said light generating means are mounted, and shaped foam spacers between said further sheet and printed circuit board, said foam spacers being contoured according to said vertebrae and organs to guide light therethrough.

15. Display apparatus as claimed in claim 14 wherein said computer means is supported on said printed circuit board.

16. Display apparatus as claimed in claim 1 wherein said circuit means includes a plurality of latch means connected in series and to respective of said light generating means, said latch means being responsive to signals received from said computer means to operate said light generating means selectively.

17. Display apparatus as claimed in claim 2 wherein said circuit means includes a plurality of latch means coupled to said computer means and responsive to signals received from said computer means to operate said display sign means.

* * * * *